(12) United States Patent
Velankar et al.

(10) Patent No.: US 12,516,012 B2
(45) Date of Patent: Jan. 6, 2026

(54) ODOROUS COMPOUNDS AND METHOD OF PREPARATION THEREOF

(71) Applicant: S.H. Kelkar and Company Limited, Maharashtra (IN)

(72) Inventors: Avdhoot D. Velankar, Maharashtra (IN); Kedar Ramesh Vaze, Maharashtra (IN); Popat D. Shinde, Maharashtra (IN)

(73) Assignee: S.H. KELKAR AND COMPANY LIMITED (IN)

( * ) Notice: Subject to any disclaimer, the term of this patent is extended or adjusted under 35 U.S.C. 154(b) by 307 days.

(21) Appl. No.: 18/277,896

(22) PCT Filed: Feb. 23, 2022

(86) PCT No.: PCT/IN2022/050155
§ 371 (c)(1),
(2) Date: Aug. 18, 2023

(87) PCT Pub. No.: WO2022/180642
PCT Pub. Date: Sep. 1, 2022

(65) Prior Publication Data
US 2024/0262776 A1     Aug. 8, 2024

(30) Foreign Application Priority Data

Feb. 23, 2021   (IN) .............................. 202121007593

(51) Int. Cl.
| | | |
|---|---|---|
| C07C 47/02 | (2006.01) | |
| C07C 29/147 | (2006.01) | |
| C07C 33/025 | (2006.01) | |
| C07C 45/29 | (2006.01) | |
| C07C 47/21 | (2006.01) | |
| C07C 49/04 | (2006.01) | |
| C11B 9/00 | (2006.01) | |

(52) U.S. Cl.
CPC ............ *C07C 47/02* (2013.01); *C07C 29/147* (2013.01); *C07C 33/025* (2013.01); *C07C 45/29* (2013.01); *C07C 47/21* (2013.01); *C07C 49/04* (2013.01); *C11B 9/0015* (2013.01)

(58) Field of Classification Search
CPC ........ C07C 47/02; C07C 29/147; C07C 45/29
See application file for complete search history.

(56) References Cited

U.S. PATENT DOCUMENTS

| | | |
|---|---|---|
| 3,959,396 A | 5/1976 | Ochsner et al. |
| 2021/0188749 A1* | 6/2021 | Mabon .................... C07C 67/08 |

FOREIGN PATENT DOCUMENTS

| | | |
|---|---|---|
| CN | 106335968 B | 5/2020 |
| EP | 3 153 492 A1 | 4/2017 |
| WO | WO 2012/025934 A1 | 3/2012 |

OTHER PUBLICATIONS

Haddad, Nizar et al.: "Studies Towards Total Synthesis of Borrelidin, Regioselective Methylation of Bis-epoxides and Structure Determination", *Tetrahedron Letters*, vol. 38, No. 34, Aug. 1, 1997, pp. 6079-6082.

Lagoutte, Roman et al.: "Total Synthesis, Proof of Absolute Configuration, and Biosynthetic Origin of Stylopsal, the First Isolated Sex Pheromone of *Strepsiptera*", *Chemistry—a European Journal*, vol. 19, No. 26, Apr. 29, 2013, pp. 8515-8524.

Safiev, O.G. et al.: "1,5-and 1,9-Migration of Hydrogen During Telomerization of Propylene With Dimethyl Acetal", *Bulletin of the Academy of Sciences of the USSR, Division of Chemical Science*, vol. 313, Jan. 1, 1980, pp. 1134-1137.

Tolasch, Till et al.: "First Sex Pheromone of the Order Strepsiptera: (3R, 5R, 9R) 3,5,9-Trimethyldodecanal in *Stylops melittae* Kirby, 1802", *Journal of Chemical Ecology*, vol. 38, No. 12, Dec. 8, 2012, pp. 1493-1503.

Maier, Thomas M. et al.: "Heterogeneous Olefin Hydrogenation Enabled by a Highly-Reduced Nickel (-II) Catalyst Precursor", *Chemistry—a European Journal*, vol. 26, No. 28, Apr. 24, 2020, pp. 6113-6117.

Ohtawa, Masaki et al.: "Design, synthesis, and biological evaluation of air-stable nafuredin-γ analogs as complex I inhibitors", *Bioorganic & Medicinal Chemistry*, vol. 23, No. 5, Jan. 22, 2015, pp. 932-943.

Ikeda, Shin-Ichi et al.: "Nickel-Catalyzed Asymmetric Multiple-Component Tandem Coupling. Effects of Simple Monodentate Oxazolines as Chiral Ligands", *Journal of the American Chemical Society*, vol. 121, No. 19, May 1, 1999, pp. 4712-4713.

Pitts, Michael R. et al.: "A chirally catalyzed ene reaction in a novel formal total synthesis of the antitumor agent laulimalide", *Tetrahedron Letters*, vol. 43, No. 47, 2002, pp. 8471-8473.

Ghostin, J. et al.: Synthesis of syn-4, 6-dimethyldodecanal, the male sex pheromone and trail-following pheromone of two species of the termite *Zootermopsis*, *Natural Product Research*, vol. 25, No. 5, Jan. 1, 2011, pp. 560-568.

(Continued)

*Primary Examiner* — Andrew S Rosenthal
(74) *Attorney, Agent, or Firm* — MASCHOFF BRENNAN

(57) ABSTRACT

The present invention relates to compounds of formula (I), wherein A represents —CH$_2$OH or —CHO, —CH$_2$OAc R$_1$ is an alkyl or alkylidene group, R$_2$ is an alkyl or alkylidene group, dotted line represents double bond or single bond. The present invention also relates to a method of preparation of the compounds and a composition comprising the compounds which is used in perfumed, flavored, deodorizing, masking composition.

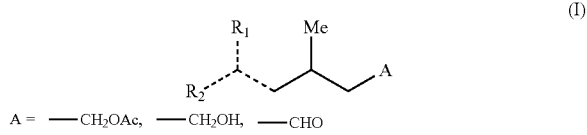

A = —CH$_2$OAc,   —CH$_2$OH,   —CHO

11 Claims, No Drawings

(56) References Cited

OTHER PUBLICATIONS

Kraft, Dr. Philip et al.: "Odds and Trends: Recent Developments in the Chemistry of Odorants", *Angewandte Chemie International Edition*, vol. 39, No. 17, Sep. 1, 2000, pp. 2980-3010.
International Search Report and Written Opinion, prepared by the European Patent Office acting as the International Searching Authority, for international application PCT/IN2022/050155 mailed Jun. 7, 2022.

* cited by examiner

ODOROUS COMPOUNDS AND METHOD OF PREPARATION THEREOF

CROSS-REFERENCE TO RELATED APPLICATIONS

This application is the National Stage entry under 35 U.S.C. § 371 of International Application Number PCT/IN2022/050155 filed on Feb. 23, 2022, published on Sep. 1, 2022 under publication number WO 2022/180642 A1, which claims the benefit of priority under 35 U.S.C. § 119 of Indian patent application number 202121007593 filed Feb. 23, 2021.

FIELD OF THE INVENTION

The present invention relates to odorous compounds denoted by formula (I), compositions comprising odorous compounds denoted by formula (I), and to process for preparation of compounds of formula (I).

BACKGROUND OF THE INVENTION

Increasing limitations on the supply of natural fragrance ingredients have revolutionized the field of synthetic fragrance ingredients. Nowadays, there is an increasing demand for novel odorants/compounds and/or novel fragrance, flavor and/or deodorizing/masking compositions comprising said odorants/compounds.

Kraft et al., (Angew. Chem. Int. Ed. Eng. 39 (2000) 2980-3010) have discussed a list of grapefruit odorants. As reported by Kraft in the above article, grapefruit odorants have many aspects: citrus-like (hesperidic), fruity-rhubarb, cassis-type as well as green notes. Grapefruit accords are widely used to impart freshness and lift to a fragrance. Nootkatone, a naturally occurring grapefruit odorant which is synthesized from valencene, is too expensive for widespread use. Other prominent grapefruit odorants include Methyl Pamplemousse (dimethyl acetal), dimethyloctenone (ketone), Floralate (ester), Floropal (acetal) and Rhubafuran (tetrahydropyran derivative). Among these odorants, typically acetals are susceptible to hydrolysis in acidic conditions found in many products whereas esters can undergo hydrolysis in basic conditions.

Another strong grapefruit odorant is 1-p-menthene-8-thiol which is found in grapefruit juice and which easily cyclizes to a 2,8-epi-thio-p-menthane derivative. Another grapefruit odorant is Corps Guava which presents green, grapefruit and blackcurrant profile. Many thiol-based odorants are unstable due to their propensity towards oxidation. Therefore, novel compounds that possess grapefruit and related odor profile and that are very stable in products, are highly desired.

It is an advantage of the present invention that novel odorous compounds denoted by formula (I) are useful as fragrance or flavor materials in particular in providing floral, grapefruit, citrus and/or rhubarb type notes to perfume, aroma or deodorizing/masking compositions.

SUMMARY

This invention relates to fragrance, flavor and/or deodorizing/masking compositions comprising compounds of formula (I); here compounds of formula (I) are selected from any one of its stereoisomers or a mixture of one or more of these stereoisomers. Further, compounds of formula (I) are selected from one of its regioisomers or a mixture of one or more of its regioisomers.

The invention further discloses odorous compound of formula (I). Particularly, the invention discloses fragrance, flavor and/or deodorizing/masking compounds of formula (I).

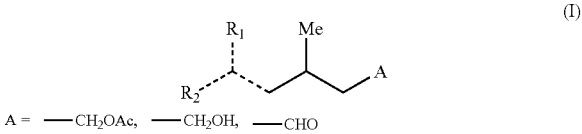

$$A = \text{—}CH_2OAc, \text{—}CH_2OH, \text{—}CHO$$

wherein A represents —$CH_2OAc$, —$CH_2OH$ or —CHO
$R_1$ is an alkyl or alkylidene group,
$R_2$ is an alkyl or alkylidene group,
dotted line represents a double bond or single bond,
with the proviso that (I) is not:
a. 3,5-dimethylhex-5-en-1-ol;
b. 3,5-dimethylhex-4-en-1-ol;
c. 3,5-dimethylhexan-1-ol;
d. 3,5-dimethylhexanal;
e. 3,5-dimethylhex-5-enal;
f. 3,5-dimethylhex-4-enal;
g. 3,5-dimethylheptan-1-ol;
h. 3,5-dimethylheptanal;
i. 5-ethyl-3-methyloct-5-en-1-ol;
j. 3,5-dimethyloctan-1-ol;
k. 3,5-dimethyloctanal;
l. 3,5-dimethylnon-4-en-1-ol;
m. 3,5-dimethylnonan-1-ol;
n. 3,5-dimethylnonanal;
o. 3,5-dimethylnon-4-enal;
p. 3,5-dimethyldec-5-en-1-ol; and
q. 3,5-dimethyldec-5-enal.

According to the present invention, radicals $R_1$ and $R_2$ are separated radicals, i.e., they do not form together a ring. It will also be clear to a person skilled in the art that both dotted lines cannot be double bonds at the same time. Thus, if $R_1$ is bonded with a double bond then $R_2$ will be bonded with a single bond; and if $R_2$ is bonded with a double bond then $R_1$ will be bonded with a single bond.

Preferably, $R_1$ and/or $R_2$ are selected from alkyl or alkylidene groups having up to 6 carbon atoms. $R_1$ and $R_2$ are independently selected from a group comprising of methyl, ethyl, n-propyl, isopropyl, n-butyl, isobutyl, tertiary-butyl, n-pentyl, n-hexyl, methylidene, ethylidene, propylidene, isopropylidene, butylidene, isobutylidene, pentylidene and hexylidene.

In another embodiment, compounds of formula (I) of this invention are chiral, e.g., they are used as pure enantiomers or diastereomers or as stereoisomeric (enantiomeric or diastereomeric) mixtures, more specifically as mixture of enantiomers or diastereoisomers; For example, as R isomer, S isomer, a racemic mixture and/or a nonracemic mixture. Further, compounds of formula (I) are advantageously used either as RR isomer, SS isomer, RS isomer, SR isomer, a racemic mixture and/or a nonracemic mixture. Further, compounds of formula (I) of this invention are used as any one of its regioisomers or a mixture of its regioisomers.

By the expression "any one of its regioisomers or a mixture of its regioisomers", it should be understood by a person skilled in the art that the presence of regioisomer results due to different position of the double bond in the structure of formula (I).

Further, the compounds of formula (I) of this invention are used as pure compounds or as mixtures of geometric isomers (diastereomers); e.g., they are a mixture of cis and trans isomers or as E and Z isomers.

DETAILED DESCRIPTION

The present invention relates to compounds of formula (I)

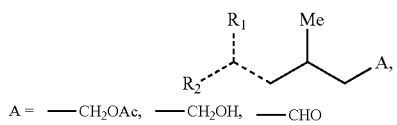

wherein A represents —CH$_2$OH or —CHO, —CH$_2$OAc
R$_1$ is an alkyl or alkylidene group,
R$_2$ is an alkyl or alkylidene group,
dotted line represents a double bond or single bond.
with the proviso that (I) are not:
a. 3,5-dimethylhex-5-en-1-ol;
b. 3,5-dimethylhex-4-en-1-ol;
c. 3,5-dimethylhexan-1-ol;
d. 3,5-dimethylhexanal;
e. 3,5-dimethylhex-5-enal;
f. 3,5-dimethylhex-4-enal;
g. 3,5-dimethylheptan-1-ol;
h. 3,5-dimethylheptanal;
i. 5-ethyl-3-methyloct-5-en-1-ol;
j. 3,5-dimethyloctan-1-ol;
k. 3,5-dimethyloctanal;
l. 3,5-dimethylnon-4-en-1-ol;
m. 3,5-dimethylnonan-1-ol;
n. 3,5-dimethylnonanal;
o. 3,5-dimethylnon-4-enal;
p. 3,5-dimethyldec-5-en-1-ol; and
q. 3,5-dimethyldec-5-enal.

Preferably, R$_1$ and R$_2$ are independently selected from a group comprising of methyl, ethyl, n-propyl, isopropyl, n-butyl, isobutyl, tertiary-butyl, n-pentyl, n-hexyl, methylidene, ethylidene, propylidene, isopropylidene, butylidene, isobutylidene, pentylidene, hexylidene.

Preferably, the compounds are selected from the following compounds:
1) 3-methyl-5-methyleneheptan-1-ol;
2) 3,5-dimethylhept-4-en-1-ol;
3) 3,5-dimethylhept-5-en-1-ol;
4) 3-methyl-5-methylideneheptanal;
5) 3,5-dimethylhept-4-enal;
6) 3,5-dimethylhept-5-enal;
7) 3-methyl-5-methyleneoctan-1-ol;
8) 3,5-dimethyloct-4-en-1-ol;
9) 3,5-dimethyloct-5-en-1-ol;
10) 3-methyl-5-methylideneoctanal;
11) 3,5-dimethyloct-4-enal;
12) 3,5-dimethyloct-5-enal;
13) 5-ethyl-3-methylhept-4-en-1-ol;
14) 5-ethyl-3-methylhept-5-en-1-ol;
15) 5-ethyl-3-methylheptan-1-ol;
16) 5-ethyl-3-methylhept-5-enal;
17) 5-ethyl-3-methylhept-4-enal;
18) 5-ethyl-3-methylheptanal;
19) 3-methyl-5-methylenenonan-1-ol;
20) 3,5-dimethylnon-5-en-1-ol;
21) 3,7-dimethyl-5-methyleneoctan-1-ol;
22) 3,5,7-trimethyloct-4-en-1-ol;
23) 3,5,7-trimethyloct-5-en-1-ol;
24) 3,5,7-trimethyloctan-1-ol;
25) 3,7-dimethyl-5-methylideneoctanal;
26) 3,5,7-trimethyloct-4-enal;
27) 3,5,7-trimethyloct-5-enal;
28) 3,5,7-trimethyloctanal;
29) 3-methyl-5-methylidenedecan-1-ol;
30) 3,5-dimethyldecan-1-ol;
31) 3-methyl-5-methylidenedecanal;
32) 3,5-dimethyldec-4-enal;
33) 3,5-dimethyldecanal;
34) 3-methyl-5-methylideneundecan-1-ol;
35) 3,5-dimethylundec-4-en-1-ol;
36) 3,5-dimethyldec-4-en-1-ol;
37) 3,5-dimethylundecanal;
38) 5-isobutyl-3,7-dimethyloct-4-en-1-ol;
39) 5-isobutyl-3,7-dimethyloct-5-en-1-ol;
40) 5-isobutyl-3,7-dimethyloctan-1-ol;
41) 3,7-dimethyl-5-(2-methylpropyl)oct-5-enal;
42) 3,7-dimethyl-5-(2-methylpropyl)oct-4-enal; and
43) 3,7-dimethyl-5-(2-methylpropyl)octanal.

Another embodiment of the present invention relates to a composition comprising a mixture of at least two compounds of the present invention.

Preferably, the content of the compound of formula (I) in the composition is at least 0.00001 wt. % or at least 0.00001 wt. % to 99.9 wt. %.

More preferably, the content of the compound of formula (I) in the composition is at least from 1 wt. % or at least 1 wt. % to 25 wt. %.

In another embodiment, the composition comprises at least one ester and/or one alcohol, preferably at least a mixture of ester and alcohol, wherein the total content of the compound(s) of formula (I) together with the ester(s) and alcohol(s) is 25 wt % or more than 25 wt % or 50 wt % or more than 50 wt %.

In an embodiment the composition as per the present invention is used in a perfumed, flavored, deodorizing or masking composition.

In an embodiment the compounds as per the present invention are used in a perfumed, flavored, deodorizing or masking composition.

Another embodiment of the present invention relates to a process for preparation of compounds of formula (I).

The process comprises the steps of:
a. Reacting a compound of formula (II)

with alcohol of formula

Isoprenol
to get a compound of formula (III)

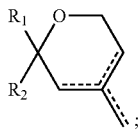

b. Reacting the compound of formula (III) with Ra—Ni and hydrogen to get a compound of formula (IV)

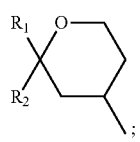

c. Reacting the compound of formula (IV) with acetic anhydride to get a compound of formula (V)

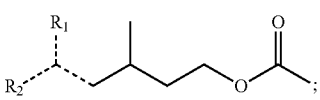

d. Reacting the compound of formula (V) with sodium hydroxide in water to get a compound of formula (VI)

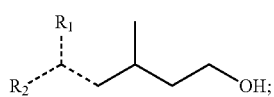

and
e. oxidation of compound of formula (VI) employing (2,2,6,6-Tetramethylpiperidin-1-yl)oxyl (TEMPO) along with N-chlorosuccinimide and a phase transfer catalyst to obtain a compound of formula (VII)

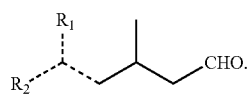

The term "odorant" characterizing the compounds according to the present invention means that in humans it triggers an odor sensation which is preferably pleasant; it is therefore conventionally used for perfuming industrial and sanitary articles, washing agents, cleaning agents, personal hygiene products, cosmetics and the like. For the purposes of the present invention and appended claims, the term "odorant" includes "aroma substances". Aroma substances is the term usually used to designate substances which provide odor and/or flavor to foodstuffs.

The compounds of formula (I) may be used alone, as mixtures thereof, or in combination with a base material.

As used herein, the "base material" includes all known fragrance/flavor materials selected from the extensive range of natural products like: essential oils, extracts, resinoids or isolates and synthetic materials currently available, such as: hydrocarbons, alcohols, aldehydes and ketones, ethers and acetals, esters and lactones, nitriles, oximes or heterocycles, and/or in admixture with one or more ingredients or excipients/adjuvants conventionally used in conjunction with odorants in fragrance and/or flavor compositions, for example: solvents/diluents, stabilizers, carrier materials, and other auxiliary agents commonly used in the art.

The compounds of formula (I) may be used in a broad range of fragrance applications, e.g., in any field of fine and functional perfumery, such as perfumes, air care products, household products, laundry products, body care products and cosmetics. The compounds are employed in widely varying amounts, depending upon the specific application and on the nature and quantity of other odorant ingredients.

According to a preferred embodiment of the invention, the fragrance, flavor and/or deodorizing/masking composition according to the present invention contains at least one compound according to formula (I) as previously described, in quantities between 0.00001 and 99.9 wt. %, for example between 0.0001 and 95 wt. %, for example between 0.001 and 25 wt. %, preferably between 0.01 and 15 wt. %, more advantageously between 0.1 and 10 wt. %, in particular between 1 and 5 wt. %, in each case relative to the entire composition.

According to a particularly preferred embodiment of the invention, in addition to a compound of formula (I) according to the present invention, the fragrance, flavor and/or deodorizing/masking composition according to the present invention contains additional odorants, for example in a quantity of 0.1 to 99.9 wt. %, preferably 5-90 wt. %, in particular 15-70 wt. %, relative to the entire fragrance and/or flavor composition.

The compounds of formula (I) as described herein above may be employed in a consumer product base simply by directly mixing at least one compound of formula (I), or a fragrance composition comprising said compound or compounds of formula (I) with the consumer product base; or they may, in an earlier step, be entrapped with an entrapment material, for example, polymers, capsules, microcapsules and/or nanocapsules, liposomes, film formers, absorbents such as active carbon or zeolites, cyclic oligosaccharides, cyclic glycolurils, and mixtures of two or more thereof, or they may be chemically bonded to substrates, which are adapted to release the fragrance molecule upon application of an external stimulus such as light, enzyme, air, water or the like, and then mixed with the consumer product base.

Thus, the invention are useful for existing methods of manufacturing a fragrance, flavor and/or deodorizing/masking composition, comprising the incorporation of one or more compounds of formula (I) as a fragrance, flavor and/or deodorizing/masking ingredient, either by directly admixing the compound to the consumer product base or by admixing a fragrance, flavor and/or deodorizing/masking composition comprising said one or more compounds of formula (I), which may then be mixed with a consumer product base, using conventional techniques and methods. Through the addition of an olfactory-acceptable amount of at least one compound of formula (I) of the present invention as hereinabove described, the odor notes of a consumer product base are improved, enhanced, and/or modified.

The present invention relates to fragrance, flavor and/or deodorizing/masking compositions comprising compounds of formula (I), The present invention relates to odorous compound of Formula (I). Particularly, the invention discloses fragrance, flavor and/or deodorizing/masking compounds of formula (I).

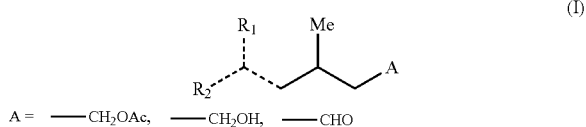

A = ——CH$_2$OAc, ——CH$_2$OH, ——CHO wherein A represents —CH$_2$OAc, —CH$_2$OH or —CHO
R$_1$ is an alkyl or alkylidene group,
R$_2$ is an alkyl or alkylidene group,
dotted line represents a double bond or single bond,
with the proviso that (I) is not:
a. 3,5-dimethylhex-5-en-1-ol;
b. 3,5-dimethylhex-4-en-1-ol;
c. 3,5-dimethylhexan-1-ol;
d. 3,5-dimethylhexanal;
e. 3,5-dimethylhex-5-enal;
f. 3,5-dimethylhex-4-enal;
g. 3,5-dimethylheptan-1-ol;
h. 3,5-dimethylheptanal;
i. 5-ethyl-3-methyloct-5-en-1-ol;
j. 3,5-dimethyloctan-1-ol;
k. 3,5-dimethyloctanal;
l. 3,5-dimethylnon-4-en-1-ol;
m. 3,5-dimethylnonan-1-ol;
n. 3,5-dimethylnonanal;
o. 3,5-dimethylnon-4-enal;
p. 3,5-dimethyldec-5-en-1-ol; and
q. 3,5-dimethyldec-5-enal.

According to the present invention, radicals R$_1$ and R$_2$ are separated radicals, i.e., they do not form together a ring.

Preferably, R$_1$ and/or R$_2$ is selected from alkyl or alkylidene having up to 6 carbon atoms. R$_1$ and R$_2$ are independently selected from a group comprising of methyl, ethyl, n-propyl, isopropyl, n-butyl, isobutyl, tertiary-butyl, n-pentyl, n-hexyl, methylidene, ethylidene, propylidene, isopropylidene, butylidene, isobutylidene, pentylidene, hexylidene.

In another embodiment, compounds of formula (I) of this invention are chiral, e.g., they are used as pure enantiomers or diastereomers or as stereoisomeric (enantiomeric or diastereomeric) mixtures, more specifically as mixture of enantiomers or diastereoisomers; For example as R isomer, S isomer, a racemic mixture and/or a nonracemic mixture. Further, compounds of formula (I) are also advantageously used either as RR isomer, SS isomer, RS isomer, SR isomer, a racemic mixture and/or a nonracemic mixture. Further, compounds of formula (I) of this invention are used as any one of its regioisomers or a mixture of its regioisomers. Further, the compounds of formula (I) of this invention are used as pure compounds or as mixtures of geometric isomers (diastereomers); e.g., they are a mixture of cis and trans isomers or as E and Z isomers.

It is an advantage of the invention that the disclosed compounds exhibit floral, grapefruit, citrus and/or rhubarb odor profiles. In addition, perfumery compositions having these novel compounds described herein exhibit floral, grapefruit, citrus and/or rhubarb odor profiles. It is another advantage that these compounds exhibit increased chemical stability as compared to conventional thiol-based or acetal or ester-based grapefruit odorants. As a result of this increased stability, the shelf life of perfumery compositions is increased. In addition, this increased stability results in a corresponding increase in persistence of the aroma given off by the perfumery compositions and therefore facilitates perfumery compositions having a decreased concentration of the odorant that provides a longer lasting aroma as compared to conventional perfumery compositions.

An embodiment of the present invention relates to an odorous composition comprising compound of Formula (I). Particularly, the invention discloses fragrance, flavor and/or deodorizing/masking composition comprising one or more compound of formula (I) and one or more adjuvant.

In general, in addition to the novel odorant and/or fragrance, flavor and/or deodorizing/masking compositions described herein, suitable fragrance, flavor or deodorizing compositions may advantageously include conventional adjuvants such as, for example, solvents, carriers, stabilizers, emulsifiers, moisturizers, dispersants, diluents, thickeners, thinners, other odorants, and/or other adjuvants, and the like.

In an embodiment, a compound of formula (I) useful in a fragrance, flavor and/or deodorising/masking composition is selected from the following compounds:
1) 3-methyl-5-methyleneheptan-1-ol;
2) 3,5-dimethylhept-4-en-1-ol;
3) 3,5-dimethylhept-5-en-1-ol;
4) 3-methyl-5-methylideneheptanal;
5) 3,5-dimethylhept-4-enal;
6) 3,5-dimethylhept-5-enal;
7) 3-methyl-5-methyleneoctan-1-ol;
8) 3,5-dimethyloct-4-en-1-ol;
9) 3,5-dimethyloct-5-en-1-ol;
10) 3-methyl-5-methylideneoctanal;
11) 3,5-dimethyloct-4-enal;
12) 3,5-dimethyloct-5-enal;
13) 5-ethyl-3-methylhept-4-en-1-ol;
14) 5-ethyl-3-methylhept-5-en-1-ol;
15) 5-ethyl-3-methylheptan-1-ol;
16) 5-ethyl-3-methylhept-5-enal;
17) 5-ethyl-3-methylhept-4-enal;
18) 5-ethyl-3-methylheptanal;
19) 3-methyl-5-methylenenonan-1-ol;
20) 3,5-dimethylnon-5-en-1-ol;
21) 3,7-dimethyl-5-methyleneoctan-1-ol;
22) 3,5,7-trimethyloct-4-en-1-ol;
23) 3,5,7-trimethyloct-5-en-1-ol;
24) 3,5,7-trimethyloctan-1-ol;
25) 3,7-dimethyl-5-methylideneoctanal;
26) 3,5,7-trimethyloct-4-enal;
27) 3,5,7-trimethyloct-5-enal;
28) 3,5,7-trimethyloctanal;
29) 3-methyl-5-methylidenedecan-1-ol;
30) 3,5-dimethyldecan-1-ol;
31) 3-methyl-5-methylidenedecanal;
32) 3,5-dimethyldec-4-enal;
33) 3,5-dimethyldecanal;
34) 3-methyl-5-methylideneundecan-1-ol;
35) 3,5-dimethylundec-4-en-1-ol;
36) 3,5-dimethyldec-4-en-1-ol
37) 3,5-dimethylundecanal
38) 5-isobutyl-3,7-dimethyloct-4-en-1-ol
39) 5-isobutyl-3,7-dimethyloct-5-en-1-ol
40) 5-isobutyl-3,7-dimethyloctan-1-ol
41) 3,7-dimethyl-5-(2-methylpropyl)oct-5-enal
42) 3,7-dimethyl-5-(2-methylpropyl)oct-4-enal
43) 3,7-dimethyl-5-(2-methylpropyl)octanal In an embodiment according to the present invention, the fragrance, flavor and/or deodorizing/masking composition comprises a compound of formula (I) which is selected from any of the compounds and/or from a mixture of two or more of the said compounds given above.

The inventors have surprisingly discovered that from an olfactory perspective, the compounds of formula (I) have grapefruit odor. In fact, compounds of formula (I) present a balanced blend of fresh citrus and rhubarb notes. Further, the compounds of formula (I) display strong floral facets. The compounds represented by the formula (I) are very retentive on a blotter and very highly diffusive. The compounds of formula (I) perform extremely well in rose and citrus accords when used in shampoo compositions whereas compounds of formula (I) present better performance than benchmarking compounds when used in fabric softener compositions containing fougère and rose accords.

In an embodiment of the present invention, the claimed fragrance, flavor and/or deodorizing/masking composition is advantageously used as a perfumery composition. Perfumery compositions according to the present invention generally include a perfume, a cologne, an eau du toilette, and/or an eau de parfum. In an embodiment of the present invention, the claimed fragrance, flavor and/or deodorizing/masking composition is advantageously used in a cosmetic formulation, a personal care product, a cleansing product, a fabric softener, and/or air freshener, and the like. Furthermore, it is within the purview of embodiments of the invention that the novel fragrance, flavor and/or deodorizing/masking composition(s) and/or novel compound(s) of formula (I) described herein may be integrated into building materials, wall and floor coverings, vehicle components, and the like.

In an embodiment, the compounds of formula (I) are combined with numerous known natural or synthetic fragrance, flavor and/or deodorizing/masking materials, whereby the range of the natural ingredients embrace not only readily-volatile but also semi-volatile and slightly-volatile components and the range of the synthetic ingredients embrace representatives from many classes of substances, such as described in Steffen Arctander, Perfume and Flavor Chemicals, vol. 1&2, Montclair, N.J., 1969; Steffen Arctander, Perfume and Flavor Materials of Natural Origin, Elizabeth, N.J., 1960 or Horst Surburg, Johannes Panten, Common Fragrance and Flavor Materials, Wiley-VCH Weinheim, 2016 and as will be evident from the following nonlimitting compilation:

Natural Products Such as:

Ajowan oil, Amyris oil, Armoise oil, Artemisia oil, Basil oil, Bees wax absolute, Bergamot oil, Birch tar oil, Black pepper oil, Black pepper oleoresin, Camphor oil, Cananga oil, Caraway oil, Cardamom oil, Carrot seed oil, Castoreum absolute, Cedar leaf oil, Cedarwood oil, Celery seed oil, Chamomile oil, Cinnamon bark oil, Cinnamon leaf oil, Cistus absolute, Cistus oil, Citronella oil, Citronella terpenes, Clary sage oil, Clove oil rectified, Cognac oil white, Coriander seed oil, Cumin seed oil, Cypress oil, Davana oil, Dill seed oil, Elemi oil, Elemi resinoid, Eucalyptus oil, Fir needle oil, Galbanum oil, Geranium oil, Ginger oil Indian, Grapefruit oil, Guaiacwood oil, Gurjun balsam, Jasmin absolute, Jatamansi oil, Juniper berry oil, Juniper leaf oil, Kachur oil, Labdanum absolute, Labdanum resinoid, Lavender oil, Lemon oil, Lemon oil terpenes, Lemongrass oil, Lime oil, *Litsea cubeba* oil, *Litsea cubeba* terpenes, Lobhan choya resinoid, Mandarin oil, *Mentha arvensis* oil, *Mentha citrata* oil, *Mimosa* absolute, Myrrh resinoid, Nagarmotha oil, Nutmeg oil, Oakmoss absolute, Oakmoss resinoid, Olibanum oil, Olibanum resinoid, Orange oil, *Origanum* oil, Palma rosa oil, Patchouli oil, Peppermint oil, Peru Balsam resinoid, Petitgrain oil, Pine needle oil, Pink pepper oil, Rose absolute, Rose oil, Rosemary oil, Sandalwood oil, Seaweed absolute, Spearmint oil, Sugandh kokila oil, Sugandh mantri oil, Tagete oil, Tolu Balsam resinoid, Tuberose absolute, Turmeric oil, Turpentine oil, Valerian oil, Vetiver oil, Vetiver terpenes.

Synthetic Raw Materials for Instance:

Esters such as: Aldehyde C16, Allyl amyl glycolate, Allyl caproate, Allyl cyclohexyl propionate, Allyl heptoate, Allyl phenoxy acetate, Amyl acetate iso, Amyl benzoate, Amyl butyrate, Amyl caproate, Amyl cinnamate, Amyl isovalerate, Amyl phenyl acetate, Amyl propionate, Amyl salicylate iso, Amyris acetate, Anisyl acetate, Benzyl acetate, Benzyl benzoate, Benzyl butyrate, Benzyl cinnamate, Benzyl formate, Benzyl isobutyrate, Benzyl isoeugenol, Benzyl propionate, Benzyl salicylate, Benzyl tiglate, Butyl acetate, Butyl butyrate, Butyl butyryl lactate, Caryophyllene acetate, Cedryl acetate, Cinnamyl acetate, Cinnamyl butyrate, Cis-3-hexenyl acetate, Cis-3-hexenyl benzoate, Cis-3-hexenyl caproate, Cis-3-hexenyl formate, Cis-3-hexenyl isobutyrate, Cis-3-hexenyl-2-methyl butyrate, Cis-3-hexenyl propionate, Cis-3-hexenyl salicylate, Cis-3-hexenyl tiglate, Citronellyl acetate, Citronellyl butyrate, Citronellyl formate, Citronellyl isobutyrate, Citronellyl propionate, Citronellyl tiglate, Cyclabute, Cyclogalbanate, Cyclohexyl ethyl acetate, Decyl acetate, Dibutyl phthalate, Diethyl malonate, Diethyl phthalate, Dihydromyrcenyl acetate, Dimethyl octanyl acetate, Dimethyl phenyl ethyl carbinyl acetate, Dioctyl adipate, Dioctyl phthalate, Dimethyl benzyl carbinyl acetate, Dimethyl benzyl carbinyl butyrate, Ethyl linalyl acetate, Ethyl 2-methyl butyrate, Ethyl 3-phenyl propionate, Ethyl acetate, Ethyl acetoacetate, Ethyl benzoate, Ethyl butyrate, Ethyl caprate, Ethyl caproate, Ethyl caprylate, Ethyl cinnamate, Ethyl heptoate, Ethyl hexyl acetate, Ethyl isobutyrate, Ethyl laurate, Ethyl pelargonate, Ethyl phenoxy acetate, Ethyl phenyl acetate, Ethyl phenyl glycidate, Ethyl propionate, Ethyl safranate, Ethyl salicylate, Ethyl valerate, Eugenyl acetate, Evemyl, Fenchyl acetate, Floramat, Frescolat ML, Fructone, Fruitate, Geranyl acetate, Geranyl butyrate, Geranyl formate, Geranyl propionate, Geranyl tiglate, Givescone, Guaiol acetate, Hedionate, Hedione, Helvetolide, Herbanate, Hexyl acetate, Hexyl benzoate, n-Hexyl butyrate, Hexyl caproate, Hexyl isobutyrate, Hexyl propionate, Hexyl salicylate, Isobornyl acetate, Isobutyl acetate, Isobutyl phenyl acetate, Isobutyl salicylate, Isoeugenyl acetate, Isononyl acetate, Isopentyrate, Isopropyl 2-methyl butyrate, Isopropyl myristate, Jasmonyl, Liffarome, Linalyl acetate, Mahagonate, Manzanate, Menthanyl acetate, Menthyl acetate, Methyl benzoate, 2-Methyl butyl acetate, Methyl camomille, Methyl cinnamate, Methyl cyclogeranate, Methyl heptine carbonate, Methyl laurate, Methyl octine carbonate, Methyl phenyl acetate, Methyl salicylate, Methyl-2-methyl butyrate, Neofolione, Nopyl acetate, Octenyl acetate, Octyl acetate, Octyl isobutyrate, Para cresyl acetate, Para cresyl isobutyrate, Para cresyl phenyl acetate, Pear ester, Peranat, Phenoxy ethyl isobutyrate, Phenyl ethyl acetate, Phenyl ethyl butyrate, Phenyl ethyl formate, Phenyl ethyl isobutyrate, Phenyl ethyl phenyl acetate, Phenyl ethyl propionate, Phenyl ethyl salicylate, Phenyl ethyl tiglate, Phenyl propyl isobutyrate, Prenyl acetate, Romandolide, Sagecete, Styrallyl acetate, Styrallyl propionate, Tangerinol, Terpinyl acetate, Thesaron, Trans-2-hexenyl acetate, Tropicate, Verdox, Verdyl acetate, Verdyl propionate, Vertenex, Vetikol acetate, Vetiveryl acetate, Yasmolys.

Lactones such as: Ambrettolide, Arova N, Celeriax, Decalactone delta, Decalactone gamma, Dodecalactone delta, Dodecalactone gamma, Ethylene brassylate, Exaltolide, Heptalactone gamma, Hexalactone delta, Hexalactone gamma, Methyl laitone, Methyl octalactone, Nonalactone delta, Nonalactone gamma, Octahydrocoumarine, Octalactone delta, Octalactone gamma, Rootylone, Silvanone supra, Undecalactone delta, Undecalactone gamma, Valerolactone gamma, 10-OxaHexaDecanolide (OHD musk), Coumarin, Habanolide, Jasmolactone.

Aldehydes such as: Acetaldehyde, Adoxal, Aldehyde C10, Aldehyde C11 iso, Aldehyde C11 moa, Aldehyde C11 undecylenic, Aldehyde C11 undecylic, Aldehyde C12 lauric, Aldehyde C12 MNA, Anisaldehyde, Amyl cinnamaldehyde, Benzaldehyde, Bourgeonal, Campholenaldehyde, Cantonal, Cetonal, Cinnamic aldehyde, Cis-4-decenal, Cis-6-nonenal, Citral, Citronellal, Citronellyl oxyacetaldehyde, Cocal, Cuminaldehyde, Curgix, Cyclal C, Cyclamen aldehyde, Cyclomyral, Cyclovertal, Decenal 9, Dupical, Empetal, Ethyl vanillin, Floralozone, Florhydral, Geraldehyde, Helional®, Heliotropin, Heptanal, Hexanal, Hexyl cinnamaldehyde, Hivernal® neo, Hydratropaldehyde, Hydroxycitronellal, Intreleven aldehyde, Isobutavan, Isocyclocitral, Isovaleraldehyde, Lilial, Limonenal, Maceal, Mefranal, Melonal, Methyl cinnamaldehyde, Nonadien-al trans-2 cis-6, Nonanal, Octanal, Oncidal, Para tolyl aldehyde, Phenyl acetaldehyde, Phenyl propyl aldehyde, Precyclemone B, Safranal, Salicylaldehyde, Scentenal, Syringa aldehyde, Trans-4-decenal, Trans-2-dodecenal, Trans-2-hexenal, Trans-2-nonenal, Trifernal, Vanillin, Veratraldehyde, Vernaldehyde Ketones such as: Acetanisol, Acetoin, Acetophenone, Aldron, Allyl ionone, Benzophenone, Benzyl acetone, Calone, Camphor, Carvone d-, Carvone l-, Cashmeran, Cedryl methyl ketone, Cepionate, Claritone, Cosmone, Crysolide, Cyclotene, Damascenone, Damascone alpha, Damascone beta, Damascone delta, Damascone gamma, Diacetyl, Dihydro beta ionone, Dihydro isojasmonate, Dimethyl octenone, Dynascone, Ethyl amyl ketone, Ethyl maltol, Fenchone, Filbertone, Geranyl acetone, Globanone, Heptyl cyclopentanone, Ionone alpha, Ionone beta, Ionone pure, Iriswood, Irone alpha, Iso E Super, Isofenchone, Isojasmone T, Isolone K, Isomenthone, Isophorone, Jasmone cis-, Kambernoir, Kephalis, Koavone, Lavendinal, Maltol, Menthone, Methyl acetophenone, Methyl amyl ketone, Methyl heptenone, Methyl hexyl ketone, Methyl ionone gamma, Methyl naphthyl ketone beta, Methyl nonyl ketone, Muscenone, Muscone, Nectaryl, Orinox, OTBC Ketone, Para tertbutylcyclohexanone, Patchwood, Phantolid, Pharaone, Piperitone, Plicatone, Raspberry ketone, Raspberry ketone methyl ether, Safraleine, Spirogalbanone pure, Tonalid, Trimofix 0, Veloutone, Vetikon.

Alcohols such as: Alcohol oxo C13, Amber core, Ambermax, Ambrinol, Amyl vinyl carbinol, Anisic alcohol, Bacdanol, Benzyl alcohol, Butanol, Cedrol crystals, Cinnamic alcohol, Citronellol, Coranol, Decanol, Dimethyl benzyl carbinol, Dimethyl octanol, Dimethyl phenyl ethyl carbinol, Dimetol, Fenchol, Hexanol, Isoborneol, Isobornyl cyclohexanol, Javanol, Keflorol, Kohinool, Lauryl alcohol, Lilyflore, Linalool oxide, Mayol, Menthol, Norlimbanol, Octanol, Osyrol, Para tertbutylcyclohexanol, Phenoxanol, Phenoxyethanol, Phenyl ethyl alcohol, Phenyl propyl alcohol, Propylene glycol, Rosaphen, Rose glycol, Styrallyl alcohol, Tricyclodecane dimethanol, Tetrahydro linalool, Tetrahydro myrcenol, Timberol, Undecavertol, Cis-3-hexenol, Citronellol laevo, Cyclofloranol, Dihydrolinalool, Dihydromyrcenol, Dimyrcetol, Ebanol, Geraniol, Isopulegol, Linalool, Nerol, Nerolidol, Nonadien-ol trans-2 cis-6, Polysantol, Rosalva, Sandalmysore core, Sandalore, Terpinen-4-ol, Terpineol, Trans-2-hexenol Phenols such as: Butylated hydroxyanisole, Dihydroeugenol, Dimethyl hydroquinone, Dimethyl resorcinol, Eugenol pure, Guaiacol, Isoeugenol, Meta cresol, Methyl diantilis, Para cresol, Propenyl guaethol, Thymol, Ultravanil.

Ethers such as: Ambroxan, Anethole, Anther, Benzyl isoamyl ether, Benzyl isopropyl ether, Benzyl isovalerate, Boisiris, Cedramber, Cetalox, Decyl methyl ether, Dibenzyl ether, Dihydro rose oxide, Diphenyl oxide, Doremox, Estragole, Ethyl linalool, Eucalyptol, Galaxolide, Gyrane, Herbavert, Lime oxide, Madrox, Methyl isoeugenol, Naphthyl isobutyl ether beta, Nerol oxide, Nerolin bromelia, Para cresyl butyl ether, Para cresyl methyl ether, Petiole, Phenyl ethyl methyl ether, Rhubafuran, Rose oxide, Rosyrane, Trisamber, Vetylbois K, Yara yara Acetals such as: Acetal CD, Acetal R, Amberketal, Boisambrene forte, Citrathal, 1,1-Diethoxyethane, Emeraldine, Freshopal, Herboxane, Indoflor, Jacinthaflor, Magnolan, Spirambrene, Viridine, Elintaal, Glycolierral, Karanal, Methyl pamplemousse, Hydrocarbons such as: Bisabolene, Camphene, Carene delta 3, Caryophyllene, Cedrene, Cymene para, Dipentene, Diphenyl methane, Isolongifolene, Limonene d-, Longifolene, Myrcene, Naphthalene, Ocimene, Pinene alpha, Pinene beta, Styrene, Terpinene gamma, Terpinolene, 1,3, 5-Undecatriene, Verdoracine.

Sulphur compounds such as: Corps cassis, Dibutyl sulphide, Dimethyl sulphide, Exovert, Grapefruit thiol, Oxane, Ribes mercaptan, Sulfurol, Thiocineol.

Nitriles such as: Cinnamyl nitrile, Citronellyl nitrile, Citronitrile, Clonal, Cumin nitrile, Hexyl cyclopentanone, Irisnitrile, Lemonile, Peonile, Tridecyl nitrile, Agrumen nitrile, n-decyl nitrile.

Oximes such as: Buccoxime, Labienoxime, Stemone.

Nitrogen heterocycles such as: 2-acetylpyrazine, 2-acetylpyridine, sec-butylquinoline, Corps racine, 2-ethyl-3,5(or 6)-dimethylpyrazine, Furfuryl pyrrole, Indole, Isobutyl quinoline, 2-Isobutyl-3(or 6)-methoxypyrazine, Isopropyl quinoline, Maritima, p-methyl quinoline, Skatol, 2,3,5-trimethylpyrazine.

Nitro compound such as: Musk Ketone.

Schiff bases such as: Aurantiol, Helianthral, Ligantraal, Verdantiol.

Other materials such as: Acetanilide, Gardamide, Paradisamide, Dimethyl anthranilate, Methyl anthranilate, n-Butyric acid, Capric acid, Caproic acid, Caprylic acid, Phenylacetic acid, Caryophyllene oxide, Cedroxyde, Tobacarol.

The compounds of formula (I) are accordingly be used for the production of compositions and as will be evident from the foregoing compilation, a wide range of known odorants/fragrance, flavor and/or deodorizing/masking materials. In the production of such compositions, the known fragrance, flavor and/or deodorizing/masking materials referred to earlier are used according to methods which are known to the perfumer such as, for example, according to W. A. Poucher, Perfumes, Cosmetics and Soaps 2, 7th Edition, Chapman and Hall, London 1974.

In an embodiment of the present invention, the claimed fragrance, flavor and/or deodorizing/masking composition comprises in addition to the compound(s) of formula (I), at least one ester and/or one alcohol (other than compound (I) if present), preferably at least a mixture of ester and alcohol; the said ester and/or alcohol are preferably selected from the list defined herein above. In an embodiment of the present invention, the claimed odorant composition is characterised by a total content of the compound(s) of formula (I) together with the ester(s) and/or alcohol(s) which is more than 25 wt.

%, preferably more than 50 wt. %, for example more than 75 wt. %, or even more than 90 wt. %.

Preparation

The compounds of formula (I) may refer to both stereoisomeric and/or regioisomeric mixture or individually isolated isomer which are prepared in 5 steps. The process detailed in the present disclosure is an improvement in the earlier reported 5-step process as described in WO2012025934A1.

In WO2012025934A1, para-toluene sulfonic acid (PTSA) was used as a catalyst in the first step involving Prins reaction. However, use of PTSA requires use of an organic solvent, typically toluene or methyl cyclohexane. Such solvent azeotropically distills with water, thereby removing water from the reaction mixture, thus pushing the equilibrium in the Prins reaction towards the forward direction. Thus, these reaction conditions result in use of organic solvents which contribute to waste management and effluent treatment load. Although the organic solvent that is used can be recovered by distillation, this distillation process adds to work up time and consumes energy.

In the research work reported in WO2012025934A1, cyclic ketones were used whereas in the present disclosure, the reactants are acyclic ketones that are known to be less reactive than typical cyclic ketones. Herein, methansulfonic acid or trifluoromethanesulfonic acid was used. Further, no organic solvent was used and the Prins reaction proceeded in absence of an organic solvent. Use of strong acid such as methansulfonic acid or trifluoromethanesulfonic acid and absence of any organic solvent obviated the need for azeotropic distillation. Overall, the improvement in the process resulted in less load on waste management and less consumption of energy since organic solvent recovery or disposal was no longer required.

In the process disclosed in WO2012025934A1, primary alcohols were oxidized to the corresponding aldehyde using catalytic TEMPO (0.1 equivalent) as a primary oxidant along with NaOCl (13% w/w solution in water) as a secondary oxidant in presence of NaBr/NaHCO$_3$ in water:toluene mixture. Since sodium hypochlorite (NaOCl) can decompose easily and is generally unstable to storage, it is not easy to obtain NaOCl solutions of exact required concentration everytime. Further, use of NaOCl as 13% w/w solution in water introduces large dilution of water in the reaction conditions. These conditions require large reaction volumes, especially when used on plant scale and this results in inefficient use of reactor capacity.

With a goal to substantially improve the oxidation protocol, use of various secondary oxidants was explored and it was found that N-chlorosuccinimide (NCS) worked very well with catalytic TEMPO as a primary oxidant, when used in a buffered solution of NaHCO$_3$ and K$_2$CO$_3$ in water with n-tetrabutylammonium chloride as a phase transfer catalyst, with DCE (dichloroethane) as the organic solvent. Instead of n-tetrabutylammonium chloride, one can also effectively use n-tetrabutylammonium bromide as a phase transfer catalyst.

Use of other secondary oxidants like Diacetoxyiodobenzene is not cost effective. Use of other oxidising conditions using DMSO & oxalyl chloride (Swern oxidation) typically requires low temperature and inert reaction conditions. More importantly, the by-product dimethyl sulfide is highly flammable and has extremely disagreeable odor. Presence of dimethyl sulfide as impurity even on very low level makes organic compounds unusable as odorants.

In the present invention an efficient process for oxidation of primary alcohol to aldehyde has been demonstrated using catalytic amount (between 0.03 to 0.1 eq) of TEMPO and N-Chlorosuccinimide as co-oxidant in aqueous medium in short reaction time 1-2 h. Alternatively, 4-hydroxy-TEMPO is used in the range of 0.1 to 0.3 equivalents. Although equivalents of 4-hydroxy-TEMPO used are higher than those of TEMPO, the advantage of using 4-hydroxy-TEMPO is due to absence of a colored impurity. In many cases, a colored impurity resulting from use of TEMPO cannot be separated from desired aldehyde product in distillation as the coloured impurity and the aldehyde have similar boiling points as well as similar retention times on gas chromatography analysis. When 4-hydroxy-TEMPO is used, there is no coloured impurity and hence purity of aldehyde products is improved.

The process involves five steps as follows:

Step 1: Reaction of compound of formula (II) with isoprenol to get a compound of formula (III).

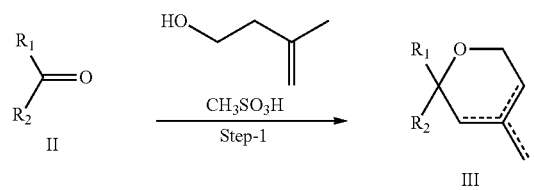

Step 2: The resulting regioisomeric mixture of pyrans (III) was hydrogenated using Raney nickel and hydrogen under pressure at elevated temperature to afford a tetrahydropyran derivative (IV).

Step 3: Reaction of compound of formula (IV) with acetic anhydride and subsequent ring opening to obtain a compound of formula (V).

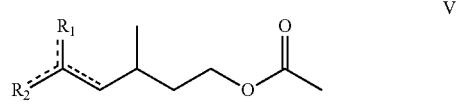

Step 4: Base-mediated hydrolysis of acetate (V) afforded an unsaturated alcohol (VI). Here base used is selected from sodium hydroxide or potassium hydroxide in water with organic solvent like methanol, ethanol, isopropanol.

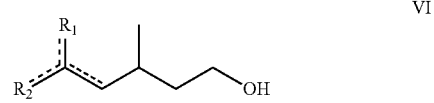

Step 5: Oxidation of compound of formula (VI) with catalytic amount (2,2,6,6-Tetramethylpiperidin-1-yl)oxyl (TEMPO) or 4-Hydroxy TEMPO and N-Chlorosuccinimide, as a secondary oxidant, in a buffered solution to obtain the compound of formula (VII).

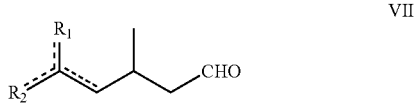

Alternatively, a compound of formula (VI) is hydrogenated using Ra—Ni catalyst at elevated temperature to get a compound of formula (VIII).

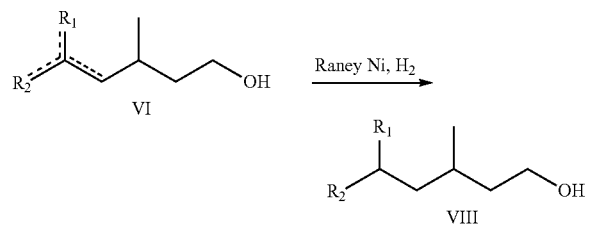

Further TEMPO-mediated oxidation of compounds of formula (VIII) affords compounds of formula (IX)

Synthetic procedures and characterization data of some selected compounds is given below.

EXAMPLES

Example-1

Synthesis of a mixture of 3,7-dimethyl-5-methylideneoctanal (compound 25), 3,5,7-trimethyloct-4-enal (compound 26) and 3,5,7-trimethyloct-5-enal (compound 27) using 4-methylpentan-2-one and isoprenol Step-1: Synthesis of a mixture of 2-isobutyl-2-methyl-4-methylenetetrahydro-2H-pyran, 2-isobutyl-2,4-dimethyl-3,6-dihydro-2H-pyran and 6-isobutyl-4,6-dimethyl-3,6-dihydro-2H-pyran To 4-methylpentan-2-one (400 g, 3.99 mol) was added methanesulfonic acid (115.0 g, 1.198 mol) over 30 min at 25° C. The reaction mixture was stirred 15 min and to it was added 3-methylbut-3-en-1-ol (413 g, 4.79 mol) over 1.5 h at 25° C. An exotherm was generated during the addition which was controlled by external cooling with water. After completion of addition, the reaction mixture was heated at 60° C. for 24 h. The reaction mixture was cooled to 25° C. and the acid layer was removed. The organic layer was washed with 120 mL of 5% aqueous sodium bicarbonate solution followed by washing with water (150 mL) and

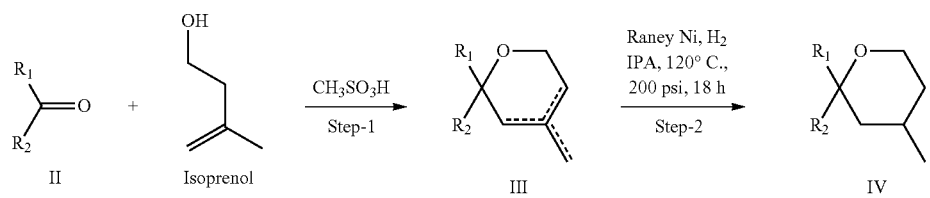

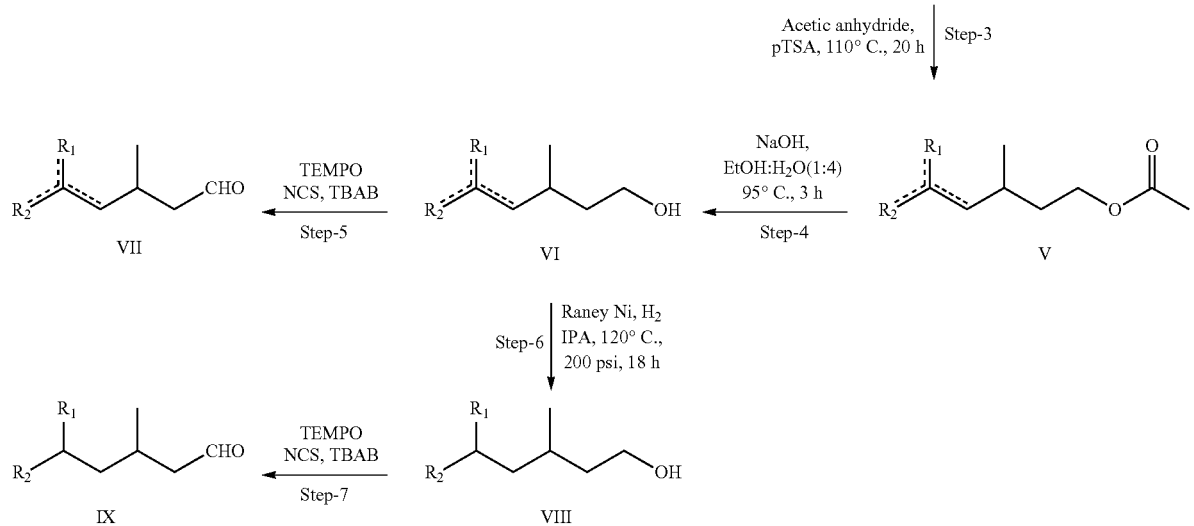

saturated brine (2×150 mL). The crude residue (690.0 g) containing 57% product by GC analysis was distilled to afford 275.0 g (41% yield) of desired product.

IR (Neat): 2953.5, 1719.0, 1609.4, 1447.6 cm$^{-1}$ $^1$H NMR (400 MHz, CDCl$_3$): δ 5.30-5.16 (m, 1H), 4.01-3.97 (m, 1H), 3.73-3.63 (m, 2H), 1.98-1.68 (m, 3H). 1.65 (s, 2H), 1.43-1.20 (m, 2H), 1.10-1.08 (m, 3H), 0.91-0.82 (m, 6H).

GC-MS (m/z): 168.2 (M+), 153.1, 140.1, 111.1

Step-2: Synthesis of 2-isobutyl-2,4-dimethyltetrahydro-2H-pyran (IV)

To a solution of a mixture from step-1 (218 g, 1.237 mol) in 2-propanol (110 mL) in an autoclave was added Raney nickel (72.6 g, 1.24 mol). The reaction mixture heated at 120° C. under 200 psi pressure of hydrogen and maintained for 18 h. The reaction mixture was cooled to 30° C. and filtered through a bed of hyflow. The hyflow bed was washed with 2-propanol (2×10 mL). The organic layer was concentrated to afford 217.0 g (96% yield) of desired product.

IR (Neat): 2951.2, 1457.2, 1373.2 cm$^{-1}$ $^1$H NMR (400 MHz, CDCl$_3$): δ 3.66-3.58 (m, 2H), 1.80-1.73 (m, 3H), 1.52-1.34 (m, 4H), 1.21-1.14 (m, 4H), 0.99-0.84 (m, 9H).

GC-MS (m/z): 171.1 (M+), 155.2, 113.1.

Step-3: Synthesis of a mixture of 3,5,7-trimethyl-oct-4-en-1-yl acetate, 3,5,7-trimethyloct-5-en-1-yl acetate and 3,7-dimethyl-5-methyleneoctyl acetate A solution of 2-isobutyl-2,4-dimethyltetrahydro-2H-pyran (107.0 g, 0.58 mol), 4-methylbenzenesulfonic acid hydrate (5.6 g, 0.029 mol) and acetic anhydride (90.0 g, 0.88 mol) was heated at 110-115° C. for 5 h. The reaction mixture was cooled to room temperature and to it were added methyl tert-butyl ether (300 mL) and water (200 mL). After stirring for 15 min, two layers were separated, and the organic layer was washed with 10% sodium carbonate solution (3×100 mL) and then with water (2×200 mL) till neutral pH. The organic layer was dried over sodium sulfate, filtered and concentrated to afford a crude mass (129 g) which was purified by fractional distillation under reduced pressure to obtain a regioisomeric mixture of acetates in 87% yield.

IR (Neat): 2955.4, 1740.7, 1230.6 cm$^{-1}$ $^1$H NMR (400 MHz, CDCl$_3$): δ 4.78-4.75 (m, 1H), 4.03-3.90 (m, 2H), 2.49-2.42 (m, 1H), 1.96-1.95 (m, 3H), 1.90-1.47 (m, 8H), 0.89-0.47 (m, 9H).

GC-MS (m/z): 212.2 (M+), 152.2, 137.2, 123.1

Step-4: Synthesis of regioisomeric mixture 3,7-dimethyl-5-methyleneoctan-1-ol (compound 21), 3,5,7-trimethyloct-4-en-1-ol (compound 22) and 3,5,7-trimethyloct-5-en-1-ol (compound 23)

A regioisomeric mixture of acetates from step-3 (950 g, 4481 mmol) was added to a solution of potassium hydroxide (453 g, 8066 mmol) and water (1044 mL) over 10 min at 25° C. The reaction mixture was heated at 100° C. for 20 h and then cooled to 25° C. The layers were separated and the organic layer was washed with water (2×500 mL) and saturated brine (2×1 L). The resulting crude was distilled to afford desired octenyl alcohol as a mixture of regioisomers (725 g, 95% yield) in the form of a yellowish oil.

Odor profile: green, grapefruit, citrus.

IR (Neat): 3342.0, 2954.9, 1713.4, 1666.6, 1459.3 cm$^{-1}$ $^1$H NMR (400 MHz, CDCl$_3$): δ 4.88-4.86 (m, 1H), 3.70-3.51 (m, 2H), 2.55-2.43 (m, 1H), 2.36 (s, 1H), 1.95-1.41 (m, 8H), 0.95-0.80 (m, 9H).

GC-MS (m/z): 170.2 (M+), 152.2, 137.1, 125.1, 109.1.

Step-5: Synthesis of a regioisomeric mixture of 3,7-dimethyl-5-methylideneoctanal (compound 25), 3,5,7-trimethyloct-4-enal (compound 26) and 3,5,7-trimethyloct-5-enal (compound 27)

To a solution of regioisomeric mixture of octenyl alcohols from step-4 (325 g, 1908 mmol) in 1,2-dichloroethane (1800 mL) at room temperature were sequentially added tetra-n-butylammonium chloride hydrate (113 g, 382 mmol) and 4-hydroxy TEMPO (65.7 g, 382 mmol). To this reaction mixture was then added a buffer solution of sodium hydrogen carbonate (135 g, 1603 mmol) and potassium carbonate (22.16 g, 160 mmol) in water (2500 mL). The reaction mixture was stirred at room temperature for 10 min. Then N-chlorosuccinimide (331 g, 2481 mmol) was added in portions over 30 minutes. The reaction mixture was stirred at room temperature for 3 h and then it was quenched with saturated solution of sodium bicarbonate. The organic layer was separated and washed with water and brine. The organic layer was dried over sodium sulphate and concentrated under reduced pressure to afford crude aldehyde. Fractional distillation under reduced pressure afforded the desired octenyl aldehyde as a regioisomeric mixture (170 g, 53% yield).

Odor profile: strong aldehydic, watery, floral.

IR (Neat): 2955.7, 2870.1, 1725.3, 1459.5 cm$^{-1}$ $^1$H NMR (400 MHz, CDCl$_3$): δ 9.79-9.67 (m, 1H), 5.02-4.91 (m, 1H), 3.01-2.91 (m, 1H), 2.35-2.29 (m, 2H), 1.95-1.57 (m, 6H), 1.02-0.79 (m, 9H).

GC-MS (m/z): 168.21 (M$^+$)

Example-2

Synthesis of 3-methyl-5-methylideneoctanal (compound 10), 3,5-dimethyloct-4-enal (compound 11) and 3,5-dimethyloct-5-enal (compound 12) from pentan-2-one and isoprenol Step-1: Synthesis of a mixture of 2-methyl-4-methylene-2-propyltetrahydro-2H-pyran, 4,6-dimethyl-6-propyl-3,6-dihydro-2H-pyran, 2,4-dimethyl-2-propyl-3,6-dihydro-2H-pyran To a solution of pentan-2-one (200.0 g, 2.32 mol) was slowly added triflic acid (10.44 g, 0.070 mol) over 20 min at 25° C. and the reaction mixture was stirred for 15 min. Then 3-methylbut-3-en-1-ol (205.0 g, 2.32 mol) was added over 30 min at room temperature. An exotherm was generated during addition which was controlled by external cooling with water. After addition, the reaction mixture was heated to 75-80° C. for 15 h. The reaction mixture was cooled to room temperature and then to it was added (500 mL) methyl tert-butyl ether. The organic layer was washed with 5% aqueous sodium bicarbonate solution (100 mL) followed by water (4×200 mL) to neutral pH. The organic solvent was evaporated under reduced pressure to afford 260 g of crude product. The crude product was distilled (70-71° C. at 17-13 mbar) to afford a regioisomeric mixture of desired products (98.0 g, 31%).

$^1$H NMR (400 MHz, CDCl$_3$): δ 5.29-5.16 (m, 2H), 4.04-3.97 (m, 2H), 3.72-3.60 (m, 2H), 1.51-1.14 (m, 4H), 1.08-1.03 (m, 4H), 0.87-0.77 (m, 4H).

GC-MS (m/z): 154.2 (M$^+$).

Step-2: Synthesis of 2,4-dimethyl-2-propyltetrahydro-2H-pyran

To a solution of a mixture of products obtained in step-1 (122 g, 0.721 mol) in isopropanol (244 mL) was added Raney Ni (10.0 g, 0.170 mol) in an autoclave. The reaction mixture was heated at 80° C., under 200 psi pressure of hydrogen gas for 5 h. Then the reaction mixture was heated at 120° C. using 300 psi hydrogen pressure for 16 h. After completion of the reaction, the reaction mixture was cooled to room temperature. The reaction mixture was filtered and then concentrated under reduced pressure. The crude residue was distilled (56-58° C. at 10-8 mbar) to afford the desired product (84.5 g, 68%).

$^1$H NMR (400 MHz, CDCl$_3$): δ 3.63-3.31 (m, 2H), 1.70-1.58 (m, 2H), 1.45-1.15 (m, 10H), 1.08-0.78 (m, 6H).

GC-MS (m/z): 155.2 (M$^+$), 113.1.

Step-3: Synthesis of a mixture of 3,5-dimethyloct-4-en-1-yl acetate, 3,5-dimethyloct-5-en-1-yl acetate and 3-methyl-5-methyleneoctyl acetate A mixture of 2,4-dimethyl-2-propyltetrahydro-2H-pyran product from step-2 (60.0 g, 0.37 mol), acetic anhydride (76.0 g, 0.74 mol) and p-TSA (3.52 g, 0.18 mol) was heated at 110° C. for 7 h. After completion of the reaction, the mixture was cooled to 30° C., then MTBE (400 mL) was added and the whole mixture was washed with water (200 mL) followed by 10% NaHCO$_3$ solution (200 mL) and then with water (3×200 mL) to neutral pH. The organic solvent was evaporated under reduced pressure to afford 72.3 g of a crude liquid which was distilled under reduced pressure (60-62° C. at 2.3-0.5 mbar) to afford a mixture of regioisomeric acetates (29.0 g, 39%) as a yellowish liquid.

Odor profile: Hedione-like, floral metallic, gardenia.

$^1$H NMR (400 MHz, CDCl$_3$): δ 5.13-4.77 (m, 1H), 4.08-3.85 (m, 2H), 2.46-3.46 (m, 1H), 1.96-1.86 (m, 8H), 1.57-1.24 (m, 4H), 0.88-0.75 (m, 6H).

GC-MS (m/z): 198.2 (M$^+$).

Step-4: Synthesis of a mixture of 3-methyl-5-methyleneoctan-1-ol (compound 7), 3,5-dimethyloct-4-en-1-ol (compound 8) and 3,5-dimethyloct-5-en-1-ol (compound 9)

A mixture of regioisomeric acetates from step-3 (15 g, 0.076 mol), potassium hydroxide (6.37 g, 0.11 mol) and water (30 mL) was heated to reflux at 100° C. for 17 h. The reaction mass was cooled to room temperature and diluted with methyl tert-butyl ether (350 mL). The organic layer was washed with water (3×150 mL) to neutral pH. The organic solvent was evaporated to afford 12.5 g of crude product. Distillation of crude product (83-87° C. at 5-7 mbar) afforded the desired product (10.02 g, 56%) as a mixture of regioisomers in the form of a colourless liquid.

Odor profile: nice floral ambery, marine hedione-like, spicy patchouli vetiver rhubarb $^1$H NMR (400 MHz, CDCl$_3$): δ 5.14-4.83 (m, 1H), 3.62-3.48 (m, 2H), 2.49-2.42 (m, 1H), 2.01-1.85 (m, 2H), 1.74-1.49 (m, 8H), 0.88-0.76 (m, 6H).

GC-MS (m/z): 156.2 (M$^+$).

Step-5: Synthesis of a mixture of 3-methyl-5-methylideneoctanal (compound 10), 3,5-dimethyloct-4-enal (compound 11) and 3,5-dimethyloct-5-enal (compound 12)

To a mixture of regioisomeric alcohols from step-4 (200.0 g, 1280 mmol) in dichloromethane (120 mL) at room temperature was added tetra-n-butylammonium chloride hydrate (152.0 g, 256 mmol) and 4-hydroxy-TEMPO (110.0 g, 640 mmol). To the above mixture, a solution of sodium bicarbonate (90.0 g, 1075 mmol) and potassium carbonate (14.86 g, 108 mmol) in water (200 mL) was added. The reaction mixture was stirred at room temperature for 10 min and then N-chlorosuccinimide (205.0 g, 1536 mmol) was added in portions over 10 min. The reaction mixture was stirred at room temperature for 1 h and then it was quenched with an aqueous saturated solution of sodium bicarbonate (500 mL). The organic layer was separated, it was washed with water (2×500 mL) and brine (1×500 mL). The organic layer was dried over anhydrous sodium sulphate and concentrated under reduced pressure to give a crude product. The crude product was purified by distillation under reduced pressure (56-58° C. at 6 mbar) to afford the desired product (125.0 g, 63%) as a mixture of regioisomers in the form of a yellowish liquid.

Odor profile: Aldehydic watery, muguet

IR (Neat): 2960.8, 2931.5, 1726.4, 1457.1 cm$^{-1}$ $^1$H NMR (400 MHz, CDCl$_3$): δ 9.66-9.65 (m, 1H), 5.06-4.84 (m, 1H), 2.92-2.81 (m, 2H), 2.32-1.81 (m, 6H), 1.56-0.73 (m, 8H).

GC-MS (m/z): 154.2 (M$^+$).

Example-3

Synthesis of a mixture of 3-methyl-5-methylenenonan-1-ol (compound 19) and 3,5-dimethylnon-5-en-1-ol (compound 20)

This compound was synthesized from hexan-2-one and isoprenol using method described in example-1.

Step-1: Synthesis of a mixture of 2-butyl-2-methyl-4-methylenetetrahydro-2H-pyran, 6-butyl-4,6-dimethyl-3,6-dihydro-2H-pyran and 2-butyl-2,4-dimethyl-3,6-dihydro-2H-pyran This compound was synthesized from hexan-2-one and isoprenol using the method described in step-1 in example-1:

Odor profile: sharp green, anise like, zesty citrus, sweet lime peel like

IR (Neat): 2933.5, 1683.6, 1452.5, 1378.4 cm$^{-1}$ $^1$H NMR (400 MHz, CDCl$_3$): δ 5.38-5.25 (m, 2H), 4.09-4.06 (m, 2H), 3.80-3.71 (m, 2H), 2.07-1.60 (m, 6H), 1.33-1.27 (m, 5H), 1.16-1.15 (m, 3H).

GC-MS (m/z): 168.1 (M$^+$), 153.1, 140.1, 111.1

Step-2: Synthesis of 2-Butyl-2,4-dimethyltetrahydro-2H-pyran

This compound was synthesized from the mixture of products obtained in step-1 example 3 using the method described in step-2 in example-1:

Odor Profile: Aromatic fresh, eucalyptus, rosemary like.

IR (Neat): 2954.6, 2929.1, 1457.1, 1375.7, 1101.1 cm$^{-1}$ $^1$H NMR (400 MHz, CDCl$_3$): δ 3.81-3.52 (m, 2H), 1.69-1.27 (m, 8H), 1.14-1.25 (m, 6H), 0.91-0.87 (m, 6H).

GC-MS (m/z): 170.2 (M$^+$).

Step-3: Synthesis of a mixture of 3,5-dimethylnon-4-en-1-yl acetate, 3,5-dimethylnon-5-en-1-yl acetate and 3-methyl-5-methylenenonyl acetate This product was synthesized from 2-butyl-2,4-dimethyltetrahydro-2H-pyran obtained in step-2 example 3 using the method described in step-3 in example-1:

Odor Profile: Floral, aldehydic.
IR (Neat): 2958.6, 2929.1, 1741.1, 1230.5 cm$^{-1}$
$^1$H NMR (400 MHz, CDCl$_3$): δ 5.25-4.81 (m, 1H), 4.14-3.92 (m, 2H), 2.04-1.92 (m, 5H), 1.67-1.55 (m, 6H), 1.37-1.27 (m, 4H), 0.95-0.85 (m, 6H).
GC-MS (m/z): 212.2 (M$^+$), 152.2, 137.1, 123.1, 110.1, 95.1.

Step-4: Synthesis of a mixture of 3-methyl-5-methylenenonan-1-ol (compound 19) and (5E)-3,5-dimethylnon-5-en-1-ol (compound 20)

This compound was synthesized from the mixture obtained in step-3 example 3, using the procedure of step-4 as given in example-1
Odor profile: Strong green, aldehydic floral.
IR (Neat): 3326.2, 2927.1, 1741.1, 1455.7, 1051.6 cm$^{-1}$
$^1$H NMR (400 MHz, CDCl$_3$): δ 5.27-4.85 (m, 1H), 3.70-3.59 (m, 2H), 2.65-2.47 (m, 1H), 2.00-1.93 (m, 4H), 1.66-1.55 (m, 4H), 1.38-1.23 (m, 4H), 0.95-0.85 (m, 6H).
GC-MS (m/z): 170.2 (M$^+$), 155.1, 137.1, 125.1, 113.1, 95.1.

Example-4

Synthesis of a mixture of 3-methyl-5-methylidenedecanal (compound 31) and 3,5-dimethyldec-4-enal (compound 32)

This compound was synthesized from heptan-2-one and isoprenol using the 5-step protocol described in example-1

Step-1: Synthesis of a mixture of 2-methyl-4-methylene-2-pentyltetrahydro-2H-pyran, 4,6-dimethyl-6-pentyl-3,6-dihydro-2H-pyran and 2,4-dimethyl-2-pentyl-3,6-dihydro-2H-pyran Odor profile: Floral, metallic, rosy green
IR (Neat): 2932.6, 1680.8, 1456.3, 1378.0 cm$^{-1}$
$^1$H NMR (400 MHz, CDCl$_3$): δ 5.38-5.25 (m, 1H), 4.09-4.06 (m, 1H), 3.78-3.73 (m, 2H), 2.07-1.79 (m, 2H), 1.60 (s, 3H), 1.36-1.1,14 (m, 8H), 0.90-0.85 (m, 5H).
GC-MS (m/z): 182.2 (M$^+$), 167.2, 139.1, 111.1

Step-2: Synthesis of 2,4-dimethyl-2-pentyltetrahydro-2H-pyran

This compound was synthesized from product of step-1 example 4 by using the method described in step-2 in example-1.
IR (Neat): 2928.5, 2860.9, 1457.4, 1375.1, 1094.3 cm$^{-1}$
$^1$H NMR (400 MHz, CDCl$_3$): δ 3.81-3.52 (m, 2H), 1.75-1.25 (m, 8H), 1.14-1.25 (m, 8H), 0.91-0.87 (m, 6H).
GC-MS (m/z): 183.2 (M$^+$), 169.2, 113.1.
Odor Profile: Fruity, lactonic, peach like Step-3: Synthesis of a mixture of 3,5-dimethyldec-4-en-1-yl acetate, 3,5-dimethyldec-5-en-1-yl acetate and 3-methyl-5-methylenedecyl acetate This compound was synthesized from product of step-2 example 4 by using the method described in step-3 in example-1.
IR (Neat): 2957.9, 2927.5, 1741.2, 1668.1, 1230.3 cm$^{-1}$
$^1$H NMR (400 MHz, CDCl$_3$): δ 5.26-4.83 (m, 1H), 4.14-3.92 (m, 2H), 2.04-1.92 (m, 5H), 1.65-1.55 (m, 6H), 1.37-1.21 (m, 6H), 0.95-0.85 (m, 6H).
GC-MS (m/z): 226.3 (M$^+$), 166.2, 151.1, 137.1, 123.1, 109.1, 95.1.
Odor Profile: Mild dry, bit woody.

Step-4: Synthesis of a mixture of 3-methyl-5-methylidenedecan-1-ol (compound 29) and 3,5-dimethyldec-4-en-1-ol (compound 36)

This compound was synthesized from product of step-3 example 4 by using the method described in step-4 in example-1:
IR (Neat): 3336.8, 2926.1, 1666.3, 1456.2, 1051.6 cm$^{-1}$
$^1$H NMR (400 MHz, CDCl$_3$): δ 5.25-4.87 (m, 1H), 3.78-3.57 (m, 2H), 2.65-2.47 (m, 1H), 2.00-1.92 (m, 4H), 1.69-1.23 (m, 10H), 0.94-0.82 (m, 6H).
GC-MS (m/z): 184.3 (M$^+$).
Odor profile: Dry green, slightly woody.

Step-5: Synthesis of a mixture of 3-methyl-5-methylidenedecanal (compound 31) and 3,5-dimethyldec-4-enal (compound 32)

This compound was synthesized from product of step-4 example 4 by using the method described in step-5 in example-1:
IR (Neat): 2957.1, 1725.0, 1457.7 cm$^{-1}$
$^1$H NMR (400 MHz, CDCl$_3$): δ 9.75-9.67 (m, 1H), 5.24-4.92 (m, 1H), 2.34-1.91 (m, 4H), 1.67-1.57 (m, 4H), 1.32-1.25 (m, 6H), 1.01-0.85 (m, 6H).
GC-MS (m/z): 182.2 (M$^+$), 164.2, 138.1, 123.1, 112.1.
Odor profile: fresh floral, aldehydic, watery.

Example-5

Synthesis of a mixture of 3-methyl-5-methylideneundecan-1-ol (compound 34) and 3,5-dimethylundec-4-en-1-ol (compound 35)

This compound was synthesized from 2-octanone and isoprenol using the method described in step-1 example-1

Step-1: Synthesis of a mixture of 2-hexyl-2-methyl-4-methylenetetrahydro-2H-pyran, 6-hexyl-4,6-dimethyl-3,6-dihydro-2H-pyran and 2-hexyl-2,4-dimethyl-3,6-dihydro-2H-pyran This compound was synthesized from 2-octanone and isoprenol using the method described in step-1 in example-1:
Odor profile: musty, floral, bit green.
IR (Neat): 2930.4, 2859.1, 1681.0, 1456.9, 1376.1 cm$^{-1}$
$^1$H NMR (400 MHz, CDCl$_3$): δ 5.38-5.25 (m, 1H), 4.08-4.06 (m, 1H), 3.79-3.70 (m, 1H), 2.04-1.52 (m, 7H), 1.48-0.85 (m, 14H).
GC-MS (m/z): 196.2 (M$^+$), 181.1, 168.2, 129.1, 111.1

Step-2: Synthesis of 2-hexyl-2,4-dimethyltetrahydro-2H-pyran

This compound was synthesized from product of step-1 example 5 by using the method described in step-2 in example-1:
IR (Neat): 2927.6, 2858.2, 1457.9, 1375.4, 1096.5 cm$^{-1}$
$^1$H NMR (400 MHz, CDCl$_3$): δ 3.79-3.65 (m, 2H), 1.98-1.24 (m, 15H), 1.15-0.85 (m, 9H).
GC-MS (m/z): 198.2 (M$^+$), 183.2, 113.1
Odor Profile: mild.

Step-3: Synthesis of 3,5-dimethylundec-4-en-1-yl acetate, 3,5-dimethylundec-5-en-1-yl acetate and 3-methyl-5-methyleneundecyl acetate This compound was synthesized from product of step-2 example 5 by using the method described in step-3 in example-1:

IR (Neat): 2926.7, 2858.4, 1741.7, 1230.4 cm$^{-1}$ $^1$H NMR (400 MHz, CDCl$_3$): δ 5.26-4.85 (m, 1H), 4.15-3.92 (m, 2H), 2.04-1.91 (m, 5H), 1.65-1.55 (m, 6H), 1.37-1.21 (m, 8H), 0.95-0.85 (m, 6H).

GC-MS (m/z): 240.2 (M$^+$), 180.2, 151.2, 95.1.

Odor Profile: Mild odor, woody.

Step-4: Synthesis of a mixture of 3-methyl-5-methylideneundecan-1-ol (compound 34) and 3,5-dimethylundec-4-en-1-ol (compound 35)

This compound was synthesized from product of step-3, example 5 by using the method described in step-4 in example-1

IR (Neat): 3333.0, 2924.5, 1456.8, 1377.9, 1052.9 cm$^{-1}$ $^1$H NMR (400 MHz, CDCl$_3$): δ 5.26-4.89 (m, 1H), 3.72-3.60 (m, 2H), 1.98-1.92 (m, 1H), 1.66-1.23 (m, 16H), 0.95-0.83 (m, 6H).

GC-MS (m/z): 198.2 (M$^+$), 180.2, 153.2, 113.1, 95.1.

Example-6

Synthesis of 3,5,7-trimethyloctanal (28)

Step-1: Synthesis 3,5,7-trimethyloctan-1-ol (24)

To a solution of a regioisomeric mixture 3,7-dimethyl-5-methyleneoctan-1-ol (compound 21), 3,5,7-trimethyloct-5-en-1-ol (compound 22) and 3,7-dimethyl-5-methyleneoctan-1-ol (compound 23) products of step-4, example-1, (200 g, 1.174 mol) in 2-propanol (200 mL) in an autoclave was added Raney nickel (10 g, 0.12 mol). The reaction mixture heated at 80° C. under 200 psi pressure of hydrogen and maintained for 18 h. The reaction mixture was cooled to 30° C. and filtered through a bed of hyflow. The hyflow bed was washed with 2-propanol (2×10 mL). The organic layer was concentrated to afford 162.0 g (80% yield) of desired product as yellowish oil.

IR (Neat): 3333.6, 2955.3, 1461.2, 1379.9 cm$^{-1}$ $^1$H NMR (400 MHz, CDCl$_3$): δ 3.71-3.59 (m, 2H), 1.64-1.54 (m, 4H), 1.44-0.78 (m, 18H).

GC-MS (m/z): 172.2 (M$^+$)

Odor profile: Aldehydic watery, floral, green

Step-2: Synthesis 3,5,7-trimethyloctanal (28)

This compound was synthesized by oxidation of 3,5,7-trimethyloctan-1-ol by using the oxidation protocol as described in step-5 in example-1.

Odor profile: Aldehydic, hot-iron like, watery

IR (Neat): 3329.2, 2957.1, 1458.9, 1378.3 cm$^{-1}$ $^1$H NMR (400 MHz, CDCl$_3$): δ 9.77-9.76 (m, 1H), 2.38-2.16 (m, 3H), 1.67-1.55 (m, 2H), 1.23-0.84 (m, 16H).

GC-MS (m/z): 170.2 (M$^+$), 126.1, 109.1, 95.1, 83.1.

Example-7

Synthesis of a mixture of 5-ethyl-3-methylhept-5-enal (compound 16) and 5-ethyl-3-methylhept-4-enal (compound 17)

Step-1: Synthesis of a mixture of 6,6-diethyl-4-methyl-3,6-dihydro-2H-pyran; 2,2-diethyl-4-methylenetetrahydro-2H-pyran and 2,2-diethyl-4-methyl-3,6-dihydro-2H-pyran This compound was synthesized in 31% yield from Pentan-4-one and isoprenol using the method described in step-1 in example-1.

GC-MS (m/z): 154.2 (M$^+$),

Step-2: Synthesis of 2,2-diethyl-4-methyltetrahydro-2H-pyran

Raney-nickel (20 g, 341 mmol) was added to the above product of step-1 (320 g, 2102 mmol) in 2-propanol (100 mL) in an autoclave chamber and the reaction was heated to 120° C. under 200 psi of continuous H$_2$ pressure for 18 h. After completion of reaction, the mixture was cooled to room temperature and filtered to afford (233 g, 71%) crude product which was used as such for the next reaction.

GC-MS (m/z): 156.2 (M$^+$),

Step-3: Synthesis of a mixture of 5-ethyl-3-methylhept-4-en-1-yl acetate and 5-ethyl-3-methylhept-5-en-1-yl acetate To a stirred solution of acetic anhydride (272 g, 2662 mmol) and p-toluenesulfonic acid monohydrate (12.66 g, 66.6 mmol) was added 2,2-diethyl-4-methyltetrahydro-2H-pyran (208 g, 1331 mmol) at room temperature and the reaction mixture was heated to 110° C. for 4 h. After completion of reaction, the mixture was cooled to room temperature and quenched with water (200 mL).

The aqueous layer was extracted with ethyl acetate (1×200 mL) and the organic layer was washed with water (3×200 mL), aqueous saturated solution of sodium bicarbonate (1×200 mL) and brine (1×50 mL). The organic layer was dried over sodium sulphate, filtered and concentrated to afford 240 g of crude compound. The crude product was purified by distillation (97-102° C. at 3-8 mbar) to afford the desired product (158 g, 60%).

GC-MS (m/z): 198.3 (M$^+$),

Step-4: Synthesis of a mixture of 5-ethyl-3-methylhept-4-en-1-ol (compound 13) and 5-ethyl-3-methylhept-5-en-1-ol (compound 14)

To a stirred solution of isomeric acetates (step-3, 137 g, 694 mmol) in ethanol (100 mL) was added a solution of sodium hydroxide (41.7 g, 1042 mmol) in water (400 mL) and the reaction mixture was stirred for 2 h at room temperature and then heated at 100° C. for 6 h. The reaction mixture was cooled to room temperature, the organic layer was separated and the aqueous layer was extracted with ethyl acetate (2×300 mL). The combined organic layer was washed with brine (1×200 mL) and dried over sodium sulphate, filtered, concentrated to give crude product (140 g). The crude product was purified by column chromatography (60-120 mesh) using ethyl acetate:n-hexane, 4-10% gradient elution, to afford the desired product (100.0 g, 66%) as a colourless liquid.

Odor profile: powdery, earthy, strong, aromatic top note
$^1$H NMR (400 MHz, CDCl$_3$): δ 5.24-5.05 (m, 1H), 3.65-3.47 (m, 2H), 2.05-1.83 (m, 4H), 1.74-1.49 (m, 4H), 0.92-0.76 (m, 9H).
GC-MS (m/z): 156.2 (M$^+$).

Step-5: Synthesis of 5-ethyl-3-methylhept-5-enal (16) & 5-ethyl-3-methylhept-4-enal (17)

This compound was synthesized in 43% yield from product of step-4 by using the oxidation method described in step 5 example-1.
GCMS (m/z): 154.2 (M$^+$)
Odor profile: Aldehydic, hot-iron, watery Example-8

Synthesis of 3-methyl-5-methylideneheptanal (4), 3,5-dimethylhept-4-enal (5), 3,5-dimethylhept-5-enal (6)

Synthesis of a mixture of 3,5-dimethylhept-4-en-1-yl acetate, 3,5-dimethylhept-5-en-1-yl acetate and 3-methyl-5-methyleneheptyl acetate This compound was synthesized from butanone and isoprenol in 3 steps as described in steps 1 to 3 from example 1.
IR (Neat): 2961.6, 2929.3, 1739.9, 1670.0 cm$^{-1}$
$^1$H NMR (400 MHz, CDCl$_3$): δ 5.28-4.84 (m, 1H), 4.15-3.91 (m, 2H), 2.01-1.33 (m, 11H), 0.97-0.82 (m, 6H).
GC-MS (m/z): 184.2 (M$^+$), 124.1, 109.1.
Odor profile: Dry aldehydic, powdery.

Synthesis of a mixture of 3-methyl-5-methyleneheptan-1-ol (compound 1), 3,5-dimethylhept-4-en-1-ol (compound 2) and 3,5-dimethylhept-5-en-1-ol (compound 3)

This compound was synthesized from a mixture of acetates described above by using the method described in step-4 in example-1:
Odor profile: Green floral.
IR (Neat): 3336.7, 2961.5, 2925.8, 1712.7, 1653.4, 1456.0 cm$^{-1}$ $^1$H NMR (400 MHz, CDCl$_3$): δ 5.25-4.83 (m, 1H), 3.70-3.52 (m, 2H), 2.04-1.91 (m, 3H), 1.78-1.29 (m, 6H), 0.97-0.80 (m, 6H).
GC-MS (m/z): 142.1 (M$^+$), 127.1, 113.1, 97.1.

Synthesis of a mixture of 3-methyl-5-methylideneheptanal (compound 4), 3,5-dimethylhept-4-enal (compound 5) and 3,5-dimethylhept-5-enal (compound 6)

This compound was synthesized from a mixture of isomeric alcohols described above by using the oxidation protocol described in step-5 in example-1.
$^1$H NMR (400 MHz, CDCl$_3$): δ 9.75-9.67 (m, 1H), 5.34-4.92 (m, 1H), 2.37-1.91 (m, 2H), 1.68-1.54 (m, 6H), 1.01-0.91 (m, 6H).
GC-MS (m/z): 140.1 (M$^+$).
Odor profile: Green floral.

Example-9

Synthesis of a mixture of 3,7-dimethyl-5-(2-methylpropyl)oct-5-enal (41) and 3,7-dimethyl-5-(2-methylpropyl)oct-4-enal (42)

This compound was synthesized from 2,6-dimethylheptan-4-one and isoprenol using method described in example-1:

Step-1: Synthesis of a mixture of 2,2-diisobutyl-4-methylenetetrahydro-2H-pyran, 2,2-diisobutyl-4-methyl-3,6-dihydro-2H-pyran and 6,6-diisobutyl-4-methyl-3,6-dihydro-2H-pyran This compound was synthesized in 42% yield from 2,6-dimethylheptan-4-one and isoprenol using the method described in step-1 in example-1:
Odor profile: Mild citrus note.
GC-MS (m/z): 210.3 (M$^+$).

Step-2: Synthesis of 2,2-diisobutyl-4-methyltetrahydro-2H-pyran

This compound was synthesized from product of step-1 above by using the method described in step-2 in example-1:
IR (Neat): 2954.8, 2926.1, 1455.5, 1375.2 cm$^{-1}$
$^1$H NMR (400 MHz, CDCl$_3$): δ 3.79-3.57 (m, 2H), 1.75-1.15 (m, 11H), 0.94-0.81 (m, 15H).
GC-MS (m/z): 212.1 (M$^+$).
Odor profile: floral, sweet, metallic.

Step-3: Synthesis of a mixture of 5-isobutyl-3,7-dimethyloct-4-en-1-yl acetate and 5-isobutyl-3,7-dimethyloct-5-en-1-yl acetate This compound was synthesized from the product of step-2 above by using the method described in step-3 in example-1
IR (Neat): 2953.6, 2925.9, 1741.2 cm$^{-1}$
$^1$H NMR (400 MHz, CDCl$_3$): δ 4.92-4.82 (m, 1H), 4.13-3.97 (m, 2H), 2.51-2.39 (m, 1H), 2.04-1.93 (m, 3H), 1.70-1.41 (m, 6H), 1.12-0.75 (m, 17H).
GC-MS (m/z): 254.2 (M$^+$).
Odor profile: Dry aromatic.

Step-4: Synthesis of a mixture of 5-isobutyl-3,7-dimethyloct-4-en-1-ol (compound 38) and 5-isobutyl-3,7-dimethyloct-5-en-1-ol (compound 39)

This compound was synthesized from product of step-3 above by using the method described in step-4 in example-1:
$^1$H NMR (400 MHz, CDCl$_3$): δ 4.98-4.84 (m, 1H), 3.73-3.60 (m, 2H), 2.59-2.37 (m, 1H), 1.97-1.43 (m, 9H), 1.12-0.75 (m, 15H).
GC-MS (m/z): 212.2 (M$^+$).
Odor profile: mild floral.

Step-5: Synthesis of a mixture of 3,7-dimethyl-5-(2-methylpropyl)oct-5-enal (compound 41) and 3,7-dimethyl-5-(2-methylpropyl)oct-4-enal (compound 42)

Odor Profile: floral, fresh aldehydic, watery $^1$H NMR (400 MHz, CDCl$_3$): δ 9.77-9.67 (m, 1H), 5.02-4.86 (m, 1H), 2.35-1.90 (m, 3H), 1.65-1.59 (m, 6H), 1.15-0.73 (m, 15H).

GC-MS (m/z): 210.2 (M$^+$).

COMPOSITION EVALUATION EXAMPLES

Comparison in Citrus Composition:

In the following example, various citrus composition accords containing two benchmarking compounds were evaluated and compared against a composition accord containing the compound from examples 21, 22 and 23. Composition A contains a mixture of compounds from example 21, 22 and 23, viz 3,7-dimethyl-5-methyleneoctan-1-ol, 3,5,7-trimethyloct-4-en-1-ol and 3,5,7-trimethyloct-5-en-1-ol as 10% w/w solution in IPM (Isopropyl myristate). Composition B contains commercial compound 6,6-dimethoxy-2,5,5-trimethylhex-2-ene, composition C contains commercial compound 3-methyl-5-phenylpentan-1-ol; and finally, composition D contains only IPM and serves as

| Raw Materials | Compositions | | | |
|---|---|---|---|---|
| (parts by weight) | A | B | C | D |
| Aldehyde C10 | 3.8 | 3.8 | 3.8 | 3.8 |
| Citral | 2.375 | 2.375 | 2.375 | 2.375 |
| Citronellyl nitrile | 6.175 | 6.175 | 6.175 | 6.175 |
| Delta decalactone | 0.095 | 0.095 | 0.095 | 0.095 |
| DPG | 0.855 | 0.855 | 0.855 | 0.855 |
| Ethyl maltol 10% | 2.375 | 2.375 | 2.375 | 2.375 |
| Hedione | 7.125 | 7.125 | 7.125 | 7.125 |
| Litsea Cubeba terpenes | 17.1 | 17.1 | 17.1 | 17.1 |
| Orange oil CP | 53.2 | 53.2 | 53.2 | 53.2 |
| Trans-2-dodecenal 10% | 1.9 | 1.9 | 1.9 | 1.9 |
| (Example21, 22 and 23) as 10% w/w solution in IPM | 5.0 | 0 | 0 | 0 |
| 6,6-dimethoxy-2,5,5-trimethylhex-2-ene | 0 | 5.0 | 0 | 0 |
| 3-methyl-5-phenylpentan-1-ol | 0 | 0 | 5.0 | 0 |
| IPM | 0 | 0 | 0 | 5.0 |
| Total | 100 | 100 | 100 | 100 |

Addition of 0.5% by weight of a mixture of compounds from Example 21, 22 and 23, viz 3,7-dimethyl-5-methyleneoctan-1-ol, 3,5,7-trimethyloct-4-en-1-ol and 3,5,7-trimethyloct-5-en-1-ol imparted a sparkling and fresh character to the citrus composition. This character was much more in strength than that observed in the citrus compositions B, C and D. Also, a tangy note was presented in the top notes. Overall performance of the composition A was highly enhanced and superior to the corresponding performances of compositions B, C and D.

Comparison in Rose Composition:

In another evaluation study, various rose composition accords containing varied benchmarking compounds were evaluated and compared against a composition accord containing a mixture of compounds from example 21, 22 and 23. Composition A contains a mixture of compounds from example 21, 22 and 23, viz 3,7-dimethyl-5-methyleneoctan-1-ol, 3,5,7-trimethyloct-4-en-1-ol and 3,5,7-trimethyloct-5-en-1-ol as 10% w/w solution in IPM (Isopropyl myristate). Composition B contains commercial compound 6,6-dimethoxy-2,5,5-trimethylhex-2-ene, composition C contains commercial compound 3-methyl-5-phenylpentan-1-ol; and finally, composition D contains only IPM and serves as blank. All above compositions were used in shampoo as well as in fabric softener.

| Raw Materials | Compositions | | | |
|---|---|---|---|---|
| (parts by weight) | A | B | C | D |
| P.E. alcohol | 38 | 38 | 38 | 38 |
| Geraniol | 19 | 19 | 19 | 19 |
| Citronellol | 8.55 | 8.55 | 8.55 | 8.55 |
| Geranyl acetate | 7.125 | 7.125 | 7.125 | 7.125 |
| Kflorol | 7.125 | 7.125 | 7.125 | 7.125 |
| PTBCA p-tertiarybutylcyclhexyl acetate | 3.325 | 3.325 | 3.325 | 3.325 |
| Eugenol | 1.9 | 1.9 | 1.9 | 1.9 |
| Rose oxide | 0.475 | 0.475 | 0.475 | 0.475 |
| Dipropylene glycol | 9.5 | 9.5 | 9.5 | 9.5 |
| (Example 21, 22 and 23) as 10% w/w solution in IPM | 5.0 | 0 | 0 | 0 |
| 6,6-dimethoxy-2,5,5-trimethylhex-2-ene | 0 | 5.0 | 0 | 0 |
| 3-methyl-5-phenylpentan-1-ol | 0 | 0 | 5.0 | 0 |
| IPM | 0 | 0 | 0 | 5.0 |
| Total | 100 | 100 | 100 | 100 |

When a mixture of compounds from Example 21, 22 and 23, viz 3,7-dimethyl-5-methyleneoctan-1-ol, 3,5,7-trimethyloct-4-en-1-ol and 3,5,7-trimethyloct-5-en-1-ol was dosed at 0.5% w/w in shampoo as well as fabric softener as illustrated in composition A, a well-rounded and more voluminous character was imparted to the composition. Compared to other compositions B and C which contained commercial compounds 6,6-dimethoxy-2,5,5-trimethylhex-2-ene and 3-methyl-5-phenylpentan-1-ol respectively, the composition A was more floral, more rosy and had more voluminous effect.

Comparison in Rose Composition:

In another evaluation study, various rose composition accords containing two commercial benchmarking compounds were evaluated and compared against a composition accord containing a mixture of compounds from example 10, 11 and 12 which is a mixture of 3-methyl-5-methylideneoctanal, 3,5-dimethyloct-4-enal and 3,5-dimethyloct-5-enal. Composition A contains a mixture of compounds from example 10,11 and 12 as a 10% w/w solution in IPM (Isopropyl myristate). Composition B contains commercial compound 4-(4-Hydroxy-4-methylpentyl)cyclohex-3-ene-1-carbaldehyde, composition C contains commercial compound 1-methyl-4-(4-methylpentyl)cyclohex-3-ene-1-carbaldehyde; and finally, composition D contains only IPM and serves as blank. All above compositions were used in shampoo.

| Raw Materials | Compositions | | | |
|---|---|---|---|---|
| (parts by weight) | A | B | C | D |
| P.E. alcohol | 38 | 38 | 38 | 38 |
| Geraniol | 19 | 19 | 19 | 19 |
| Citronellol | 8.55 | 8.55 | 8.55 | 8.55 |
| Geranyl acetate | 7.125 | 7.125 | 7.125 | 7.125 |
| Kflorol | 7.125 | 7.125 | 7.125 | 7.125 |
| PTBCA p-tertiarybutylcyclhexyl acetate | 3.325 | 3.325 | 3.325 | 3.325 |
| Eugenol | 1.9 | 1.9 | 1.9 | 1.9 |
| Rose oxide | 0.475 | 0.475 | 0.475 | 0.475 |

-continued

| Raw Materials (parts by weight) | Compositions | | | |
|---|---|---|---|---|
| | A | B | C | D |
| Dipropylene glycol | 9.5 | 9.5 | 9.5 | 9.5 |
| (Example 10, 11 and 12) as 10% w/w solution in IPM | 5.0 | 0 | 0 | 0 |
| 4-(4-Hydroxy-4-methylpentyl)cyclohex-3-ene-1-carbaldehyde | 0 | 5.0 | 0 | 0 |
| 1-methyl-4-(4-methylpentyl)cyclohex-3-ene-1-carbaldehyde | 0 | 0 | 5.0 | 0 |
| IPM | 0 | 0 | 0 | 5.0 |
| Total | 100 | 100 | 100 | 100 |

When a mixture of compounds from Example 10, 11 and 12 was dosed at 0.50% w/w in shampoo, an impactful floral character was imparted to the composition. Compared to other compositions B and C which contained commercial compounds Lyral and Vernaldehyde respectively, the composition A had more rosy and more rounded effect.

Few compounds encompassed by the scope of the present invention are disclosed herewith. It must be noted that the disclosed compounds do not limit the scope of the present invention.

The foregoing description of the invention has been set merely to illustrate the invention and is not intended to be limiting. Since modifications of the disclosed embodiments incorporating the spirit and substance of the invention may occur to person skilled in the art, the invention should be construed to include everything within the scope of the disclosure.

The invention claimed is:

1. A compound of formula (I):

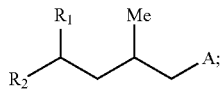

wherein A represents —CH$_2$OH or —CHO, —CH$_2$OAc and wherein R$_1$ and R$_2$ are independently selected from a group comprising of methyl, ethyl, n-propyl, isopropyl, n-butyl, isobutyl, tertiary-butyl, n-pentyl, n-hexyl, methylidene, ethylidene, propylidene, isopropylidene, butylidene, isobutylidene, pentylidene, hexylidene.

2. A compound of formula (I):

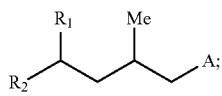

wherein A represents —CH$_2$OH or —CHO, —CH$_2$OAc and is selected from the following compounds:
1) 3-methyl-5-methyleneheptan-1-ol;
2) 3,5-dimethylhept-4-en-1-ol;
3) 3,5-dimethylhept-5-en-1-ol;
4) 3-methyl-5-methylideneheptanal;
5) 3,5-dimethylhept-4-enal;
6) 3,5-dimethylhept-5-enal;
7) 3-methyl-5-methyleneoctan-1-ol;
8) 3,5-dimethyloct-4-en-1-ol;
9) 3,5-dimethyloct-5-en-1-ol;
10) 3-methyl-5-methylideneoctanal;
11) 3,5-dimethyloct-4-enal;
12) 3,5-dimethyloct-5-enal;
13) 5-ethyl-3-methylhept-4-en-1-ol;
14) 5-ethyl-3-methylhept-5-en-1-ol;
15) 5-ethyl-3-methylheptan-1-ol;
16) 5-ethyl-3-methylhept-5-enal;
17) 5-ethyl-3-methylhept-4-enal;
18) 5-ethyl-3-methylheptanal;
19) 3-methyl-5-methylenenonan-1-ol;
20) 3,5-dimethylnon-5-en-1-ol;
21) 3,7-dimethyl-5-methyleneoctan-1-ol;
22) 3,5,7-trimethyloct-4-en-1-ol;
23) 3,5,7-trimethyloct-5-en-1-ol;
24) 3,5,7-trimethyloctan-1-ol;
25) 3,7-dimethyl-5-methylideneoctanal;
26) 3,5,7-trimethyloct-4-enal;
27) 3,5,7-trimethyloct-5-enal;
28) 3,5,7-trimethyloctanal;
29) 3-methyl-5-methylidenedecan-1-ol;
30) 3,5-dimethyldecan-1-ol;
31) 3-methyl-5-methylidenedecanal;
32) 3,5-dimethyldec-4-enal;
33) 3,5-dimethyldecanal;
34) 3-methyl-5-methylideneundecan-1-ol;
35) 3,5-dimethylundec-4-en-1-ol;
36) 3,5-dimethyldec-4-en-1-ol;
37) 3,5-dimethylundecanal;
38) 5-isobutyl-3,7-dimethyloct-4-en-1-ol;
39) 5-isobutyl-3,7-dimethyloct-5-en-1-ol;
40) 5-isobutyl-3,7-dimethyloctan-1-ol;
41) 3,7-dimethyl-5-(2-methylpropyl)oct-5-enal;
42) 3,7-dimethyl-5-(2-methylpropyl)oct-4-enal;
43) 3,7-dimethyl-5-(2-methylpropyl)octanal; and
44) the compound of formula (I) wherein R$_1$ is methyl and R$_2$ is tertiary-butyl.

3. A composition comprising a mixture of at least two compounds as claimed in claim 2.

4. The composition as claimed in claim 3 wherein the content of the compound of formula (I) in the composition is at least 0.00001 wt. %.

5. The composition as claimed in claim 4 wherein the content of the compound of formula (I) in the composition is at least 1 wt. %.

6. The composition as claimed in claim 3, comprising at least one ester and/or one alcohol wherein the total content of the compound(s) of formula (I) together with the ester(s) and alcohol(s) is 25 wt % or more than 25 wt %.

7. The composition as claimed in claim 3, in a perfumed, flavored, deodorizing or masking composition.

8. A process for preparation of a compound of formula (I),

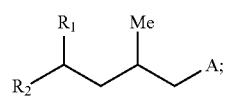

wherein:
A represents —CH$_2$OH or —CHO, —CH$_2$OAc;
dotted line represents double bond or single bond; and
R1 is an alkyl or alkylidene group, R2 is an alkyl or alkylidene group, the process comprising the steps of:

a. Reacting a compound of formula (II)

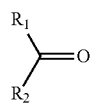  II with alcohol of formula

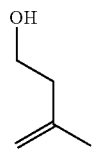

to get a compound of formula (III)

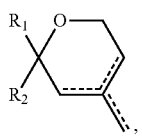  III wherein $R_1$ is an alkyl or alkylidene group, $R_2$ is an alkyl or alkylidene group, dotted line represents double bond or single bond;

b. Reacting the compound of formula (III) with Ra-Ni and hydrogen to get a compound of formula (IV)

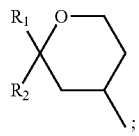  IV and c. Reacting the compound of formula (IV) with acetic anhydride to get a compound of formula (V), which is the compound of formula (I) wherein A represents —CH$_2$OAc,

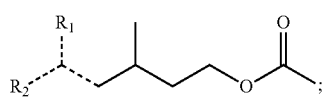  V and optionally:

d. Reacting the compound of formula (V) with sodium hydroxide in water to get a compound of formula (VI) which is the compound of formula (I) wherein A represents —CH$_2$OH,

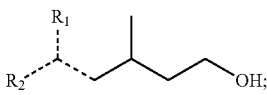  VI and optionally e. oxidation of compound of formula (VI) employing (2,2,6,6-Tetramethylpiperidin-1-yl)oxyl (TEMPO) or 4-hydroxy-TEMPO (4-Hydroxy-2,2,6,6-tetramethylpiperidine-1-oxyl) along with N-chlorosuccinimide and a phase transfer catalyst to obtain a compound of formula (VII) which is the compound of formula (I) wherein A represents —CHO,

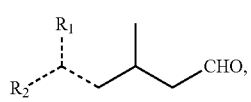  VII or optionally the compound of formula (VI) is hydrogenated using Ra-Ni catalyst at elevated temperature to get a compound of formula (VIII) which is the saturated compound of formula (I) wherein A represents —CH$_2$OH,

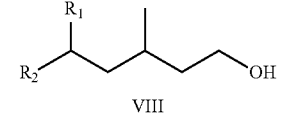

VIII and optionally TEMPO-mediated oxidation of compounds of formula (VIII) to afford a compound of formula (IX) which is the saturated compound of formula (I) wherein A represents —CHO,

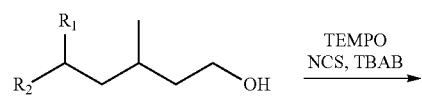

VIII

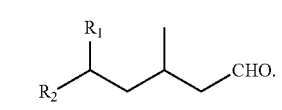

IX

9. The composition as claimed in claim 3 wherein the content of the compound of formula (I) in the composition is at least 0.00001 wt. % to 99.9 wt. %.

10. The composition as claimed in claim 4 wherein the content of the compound of formula (I) in the composition is at least 1 wt. % to 25 wt. %.

11. The composition as claimed in claim 3, comprising at least one ester and/or one alcohol wherein the total content of the compound(s) of formula (I) together with the ester(s) and alcohol(s) is at least 50 wt %.

* * * * *